United States Patent
Patel

(10) Patent No.: US 12,502,358 B1
(45) Date of Patent: Dec. 23, 2025

(54) CENTANAFADINE MULTIPHASIC CONTROLLED-RELEASE PHARMACEUTICAL FORMULATION

(71) Applicant: Jayendrakumar Dasharathlal Patel, Robbinsville, NJ (US)

(72) Inventor: Jayendrakumar Dasharathlal Patel, Robbinsville, NJ (US)

(73) Assignee: Innovate Therapeutics LLC, Princeton, NJ (US)

( * ) Notice: Subject to any disclaimer, the term of this patent is extended or adjusted under 35 U.S.C. 154(b) by 0 days.

(21) Appl. No.: 18/801,899

(22) Filed: Aug. 13, 2024

(51) Int. Cl.
| | |
|---|---|
| *A61K 9/50* | (2006.01) |
| *A61K 9/20* | (2006.01) |
| *A61K 9/24* | (2006.01) |
| *A61K 31/403* | (2006.01) |

(52) U.S. Cl.
CPC ............ *A61K 9/209* (2013.01); *A61K 9/2081* (2013.01); *A61K 9/5047* (2013.01); *A61K 9/5089* (2013.01); *A61K 31/403* (2013.01)

(58) Field of Classification Search
None
See application file for complete search history.

(56) References Cited

U.S. PATENT DOCUMENTS

| | | | |
|---|---|---|---|
| 5,225,202 A | 7/1993 | Hodges et al. | |
| 8,846,100 B2 | 9/2014 | Shojaei et al. | |
| 8,877,798 B2 | 11/2014 | Skolnick et al. | |
| 11,299,458 B2 | 4/2022 | McKinney et al. | |
| 11,564,885 B2 | 1/2023 | Mateen et al. | |
| 2012/0302619 A1 | 11/2012 | Skolnick et al. | |
| 2014/0206740 A1 | 7/2014 | McKinney et al. | |
| 2016/0120819 A1* | 5/2016 | Vargas Rincon | A61K 9/1676 424/490 |
| 2021/0047268 A1 | 2/2021 | McKinney et al. | |
| 2022/0265557 A1* | 8/2022 | Mateen | A61K 9/1623 |
| 2022/0347157 A1 | 11/2022 | McKinney et al. | |
| 2023/0338293 A1* | 10/2023 | Mateen | A61K 9/1635 |
| 2024/0140910 A1 | 5/2024 | Otsuka et al. | |

FOREIGN PATENT DOCUMENTS

| | | | |
|---|---|---|---|
| WO | 2015089111 A1 | 6/2015 | |
| WO | 2024043260 A1 | 2/2024 | |
| WO | WO-2024048782 A1 * | 3/2024 | ........... A61K 31/343 |

OTHER PUBLICATIONS

Han Lennernas, "Ethanol-Drug Absorption Interaction: Potential for a Significant Effect on the Plasma Pharmacokinetics of Ethanol Vulnerable Formulations," Mol. Pharmaceutics, 2009, 6 (5), pp. 1429-1440.
Wigal SB, Wigal T, Hobart M, Madera JJ, Baker RA, Kohegyi E, Mckinney A, Wilens TE. Safety and Efficacy of Centanafadine Sustained-Release in Adults With Attention-Deficit Hyperactivity Disorder: Results of Phase 2 Studies. Neuropsychiatr Dis Treat. Jun. 8, 2020;16:1411-1426. doi: 10.2147/NDT.S242084. PMID: 32606695; PMCID: PMC7292254.
Schein J, Cloutier M, Gauthier-Loiselle M, Catillon M, Xu C, Chan D, Childress A. Assessment of centanafadine in adults with attention-deficit/hyperactivity disorder: A matching-adjusted indirect comparison vs lisdexamfetamine dimesylate, atomoxetine hydrochloride, and viloxazine extended-release. J Manag Care Spec Pharm. Jun. 2024;30 (6):528-540. doi: 10.18553/jmcp.2024.30.6.528. PMID: 38824626; PMCID: PMC11145007.
Veronesi GF, Gabellone A, Tomlinson A, Solmi M, Correll CU, Cortese S. Treatments in the pipeline for attention-deficit/ hyperactivity disorder (ADHD) in adults. Neurosci Biobehav Rev. Aug. 2024; 163:105774. doi: 10.1016/j. neubiorev.2024.105774. Epub Jun. 22, 2024. PMID: 38914177.

* cited by examiner

*Primary Examiner* — Susan T Tran

(57) ABSTRACT

A centanafadine multiphasic controlled-release pharmaceutical formulation comprising a centanafadine continuous phase surrounding a centanafadine particulate phase, wherein the amount of centanafadine contained in the centanafadine continuous phase facilitates a first release rate of the centanafadine, and the amount of centanafadine contained in the centanafadine particulate phase facilitates the second and/or third release rate of the centanafadine. The centanafadine particulate phase is formulated in the form of a plurality of the centanafadine particulates and the centanafadine continues phase is formulated in the form of centanafadine burst release coat surrounding one or more centanafadine particulates of the plurality of the centanafadine particulates. The related method of making the pharmaceutical formulation, and treatment of the disease conditions using the centanafadine multiphasic controlled-release pharmaceutical formulation is also disclosed herein.

6 Claims, No Drawings

CENTANAFADINE MULTIPHASIC CONTROLLED-RELEASE PHARMACEUTICAL FORMULATION

FIELD OF THE DISCLOSURE

The disclosure relates generally to a centanafadine multiphasic controlled-release pharmaceutical formulation, the related method of making the pharmaceutical formulation, and treatment of the disease conditions (e.g., treatment of and prevention of central nervous system disorders and other conditions affected by monoamine neurotransmitters) using the centanafadine multiphasic controlled-release pharmaceutical formulation.

BACKGROUND

Centanafadine is a novel serotonin-norepinephrine-dopamine reuptake inhibitor: an unbalanced triple reuptake inhibitor with the most potency towards the norepinephrine reuptake transporter (NET), one-sixth as much towards the dopamine reuptake transporter (DAT), and one-fourteenth as much towards the serotonin reuptake transporter (SERT). Chemically, Centanafadine is (1R,5S)-1-(naphthalen-2-yl)-3-azabicyclo[3.1.0]hexane. Centanafadine is new chemical entity, and is classified as BCS class 1 molecule, which is highly soluble and highly permeable. Due to its high therapeutic dose, centanafadine presents challenges for developing controlled release pharmaceutical formulation in beads form. Therefore, there is a need to formulate a novel pharmaceutical formulation containing centanafadine, more specifically, centanafadine multiphasic controlled-release pharmaceutical formulation in beads or particulates containing a high drug load or a high load of centanafadine while providing prolonged therapeutic efficacy in treating a disease condition.

SUMMARY

The preferred embodiment of the presently disclosed subject matter provides a centanafadine multiphasic controlled-release pharmaceutical formulation comprising a centanafadine continuous phase surrounding a centanafadine particulate phase, wherein the amount of centanafadine contained in the centanafadine continuous phase facilitates a first release rate of the centanafadine, and the amount of centanafadine contained in the centanafadine particulate phase facilitates the second and/or third release rate of the centanafadine.

In certain embodiments, the centanafadine particulate phase is formulated in the form of a plurality of the centanafadine particulates and the centanafadine continues phase is formulated in the form of centanafadine burst release coat surrounding one or more centanafadine particulates of the plurality of the centanafadine particulates.

The preferred embodiment of the presently disclosed subject matter provides a centanafadine multiphasic controlled-release pharmaceutical formulation comprising (1) a centanafadine particulate phase that is formed of a plurality of centanafadine particulates, wherein the plurality of centanafadine particulates comprises, based on the total weight of the plurality of the centanafadine particulates, about 0-100% w/w of centanafadine prolonged release particulates and about 0-100% w/w of centanafadine enteric release particulates; and (2) a centanafadine continuous phase that is formed surrounding one or more individual centanafadine particulates of the plurality of the centanafadine particulates, wherein each centanafadine continuous phase formed surrounding the one or more individual centanafadine particulates is in the form of centanafadine burst release coat, wherein the centanafadine particulate phase retards the release of at least about 25% amount of the centanafadine contained therein for at least a period of about 2 hours when measured in-vitro in an aqueous media with a pH of below about 5 while the centanafadine continuous phase releases at least about 75% amount of the centanafadine contained therein within a period of about 2 hours when measured in-vitro in an aqueous media with a pH of below about 5, wherein the centanafadine multiphasic controlled-release pharmaceutical formulation, based on the total weight of centanafadine contained therein, provide (comprising) about 1%-45% w/w of the centanafadine in a burst release form (burst release centanafadine), and at least one from (1) about 10%-88% w/w of the centanafadine in a prolonged-release form (prolonged release centanafadine), and (2) about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates, wherein the plurality of centanafadine particulates comprises, based on the total weight of the plurality of the centanafadine particulates, about 15-90% w/w of centanafadine prolonged release particulates and about 10-85% w/w of centanafadine enteric release particulates; and (2) a centanafadine continuous phase that is formed surrounding one or more individual centanafadine particulates of the plurality of the centanafadine particulates, wherein each centanafadine continuous phase formed surrounding the one or more individual centanafadine particulates is in the form of centanafadine burst release coat, wherein the centanafadine particulate phase retards the release of at least about 25% amount of the centanafadine contained therein for at least a period of about 2 hours when measured in-vitro in an aqueous media with a pH of below about 5 while the centanafadine continuous phase releases at least about 75% amount of the centanafadine contained therein within a period of about 2 hours when measured in-vitro in an aqueous media with a pH of below about 5, wherein the centanafadine multiphasic controlled-release pharmaceutical formulation, based on the total weight of centanafadine contained therein, provide (comprising) about 1%-45% w/w of the centanafadine in a burst release form (burst release centanafadine), about 10%-88% w/w of the centanafadine in a prolonged-release form (prolonged release centanafadine), and about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates; and (2) a centanafadine continuous phase that is formed surrounding one or more individual centanafadine particulates of the plurality of the centanafadine particulates, wherein the centanafadine particulate phase retards the release of at least about 25% amount of centanafadine contained therein for at least a period of about 2 hours when measured in-vitro in an aqueous media with a pH of below about 5 while the centanafadine continuous phase releases at least about 75% amount of centanafadine contained therein within a period of about 2 hours when measured in-vitro in an aqueous media with a pH of below about 5, wherein each of the one or more individual centanafadine particulates, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg, wherein the centanafadine continuous phase formed surrounding each of the one or more individual centanafadine particulates comprising the centanafadine and one or more excipients in the weight ratio of about 10:0 to 2:8, respectively, and a combination of the centanafadine particulate and the centanafadine continuous phase (the centanafadine particulate encased within the centanafadine continuous phase) has a size in the range of about 55 microns to about 3000 microns and a weight in the range of about 0.015-25 mg, respectively, wherein the plurality of centanafadine particulates (the centanafadine particulate phase) comprises, based on the total weight of the plurality of the centanafadine particulates, about 0-100% w/w of centanafadine prolonged release particulates and about 0-100% w/w of centanafadine enteric release particulates, and each centanafadine continuous phase formed surrounding the one or more individual centanafadine particulates is in the form of centanafadine burst release coat, and wherein the centanafadine multiphasic controlled-release pharmaceutical formulation, based on the total weight of centanafadine contained therein, provide (collectively comprising) about 1%-45% w/w of the centanafadine in a burst release form (burst release centanafadine), and at least one from (1) about 10%-88% w/w of the centanafadine in a prolonged-release form (prolonged release centanafadine), and (2) about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates; and (2) a centanafadine continuous phase that is formed surrounding one or more individual centanafadine particulates of the plurality of the centanafadine particulates, wherein the centanafadine particulate phase retards the release of at least about 25% amount of centanafadine contained therein for at least a period of about 2 hours when measured in-vitro in an aqueous media with a pH of below about 5 while the centanafadine continuous phase releases at least about 75% amount of centanafadine contained therein within a period of about 2 hours when measured in-vitro in an aqueous media with a pH of below about 5, wherein each of the one or more individual centanafadine particulates, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg, wherein the centanafadine continuous phase formed surrounding each of the one or more individual centanafadine particulates comprising the centanafadine and one or more excipients in the weight ratio of about 10:0 to 2:8, respectively, and a combination of the centanafadine particulate and the centanafadine continuous phase (the centanafadine particulate encased within the centanafadine continuous phase) has a size in the range of about 55 microns to about 3000 microns and a weight in the range of about 0.015-25 mg, respectively, wherein the plurality of centanafadine particulates (the centanafadine particulate phase) comprises, based on the total weight of the plurality of the centanafadine particulates, about 15-90% w/w of centanafadine prolonged release particulates and about 10-85% w/w of centanafadine enteric release particulates, and each centanafadine continuous phase formed surrounding the one or more individual centanafadine particulates is in the form of centanafadine burst release coat, and wherein the centanafadine multiphasic controlled-release pharmaceutical formulation, based on the total weight of centanafadine contained therein, provide (collectively comprising) about 1%-45% w/w of the centanafadine in a burst release form (burst release centanafadine), about 10%-88% w/w of the centanafadine in a prolonged-release form (prolonged release centanafadine), and about 8%-80% w/w of the centanafadine in an enteric release form (enteric release centanafadine).

In certain embodiments, each of the one or more individual centanafadine particulates surrounded by the centanafadine continuous phase provides a bi-phasic release of the centanafadine contained therein in the sequence of a burst release of centanafadine followed by a prolonged release of centanafadine or an enteric release of centanafadine.

In certain embodiments, for administration to the mammal by the non-parenteral route such as oral, the presently disclosed pharmaceutical formulation can be compressed (with other one or more pharmaceutically acceptable excipients) to form a tablet, fill in a capsule to form a capsule dosage form, prepared as particles, prepared in suspension or a unit dose packet (sometimes refer to in the art as a "sachet").

DETAILED DESCRIPTION

The terms used in this specification generally have their ordinary meanings in the art, within the context of this present disclosure, and in the specific context where each term is used. Certain terms are discussed below, or elsewhere in the specification, to provide additional guidance to the practitioner in describing the formulation and how to make and use them.

As used herein, the use of the word "a" or "an" when used in conjunction with the term "comprising" in the claims and the specification can mean "one," but it is also consistent with the meaning of "one or more," "at least one," and "one or more than one." Still further, the terms "having," "including," "containing", "comprising", "consisting", and "comprises" are interchangeable, and one of skills in the art is cognizant that these terms are open-ended terms.

The terms "drug", "drug substance", "active pharmaceutical agent", "active agent", "active pharmaceutical ingredient", and "active ingredient" refer to "centanafadine or a pharmaceutically acceptable salt form of centanafadine, such as Centanafadine HCl". Centanafadine is a serotonin-norepinephrine-dopamine reuptake inhibitor: an unbalanced triple reuptake inhibitor with the most potency towards the norepinephrine reuptake transporter (NET), one-sixth as much towards the dopamine reuptake transporter (DAT), and one-fourteenth as much towards the serotonin reuptake transporter (SERT). Centanafadine is (1R,5S)-1-(naphthalen-2-yl)-3-azabicyclo[3.1.0]hexane.

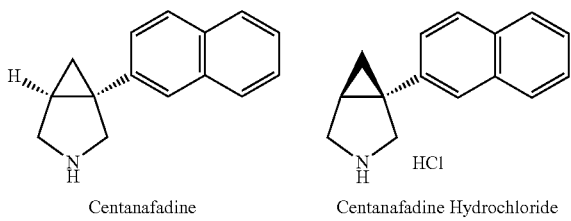 [SMILES: c1ccc2cc([C@]34CNC[C@H]3C4)ccc2c1 ; c1ccc2cc([C@]34CNC[C@H]3C4)ccc2c1 ; Cl]

Centanafadine        Centanafadine Hydrochloride

In the preferred embodiment, "centanafadine" can be employed or used in the pharmaceutical formulation in any form including, but not limited to, in base form (as such), salt form (such as centanafadine hydrochloride), any pharmaceutically acceptable form, any polymorphic form, anhydrous as well as hydrated form, solvates, co-crystal, crystalline or amorphous form, a single-component or multiple-component crystal, clathrate, etc. All such forms of "centanafadine" are within the scope of the present disclosure, and it refers to centanafadine. The present invention does not limit to any specific form of centanafadine, and therefore, the centanafadine can be used in any pharmaceutically acceptable form to prepare the centanafadine multiphasic controlled release pharmaceutical formulation.

The term "about" or "approximately" means within an acceptable error range for the particular value as determined by one of the ordinary skills in the art. For example, "about" can mean a range of up to 20%, up to 15%, up to 10%, up to 5%, or up to 1% of a given value.

The term "pharmaceutical formulation", "formulation", "unit dosage form" or "dosage form" refers to a unit dosage form (or an oral pharmaceutical dosage form in any of a solid oral dosage form or a liquid oral dosage form) suitable for oral administration comprising a predetermined therapeutically effective amount of centanafadine (e.g., from about 10 mg to about 2000 mg of centanafadine) and one or more excipients, at least one excipient is selected from a prolonged release material and an enteric material.

The term "centanafadine multi-phasic controlled-release pharmaceutical formulation" refers to a pharmaceutical formulation that releases the centanafadine contained therein in at-least two different release forms, wherein one release form is a burst release centanafadine, and another release form is at one selected from a prolonged release centanafadine, and an enteric release centanafadine. In general, the term "centanafadine multi-phasic controlled-release pharmaceutical formulation" refers to a pharmaceutical formulation that releases the centanafadine contained therein in any one combination selected from: (1) the burst release of centanafadine and the prolonged release of centanafadine; (2) the burst release of centanafadine and the enteric release of centanafadine; or (3) the burst release of centanafadine, the prolonged release of centanafadine, and the enteric release of centanafadine.

The term "enteric release of centanafadine", or "enteric release centanafadine" includes any one from enteric-burst release centanafadine, enteric-prolonged release centanafadine, and enteric-burst-prolonged release centanafadine.

The terms "particle", "particulate", "pellet", "sphere" or "bead" can be used interchangeably and refer to, without any limitations on the nature and size thereof, any particle, drug-excipient complex, sphere, bead, granule, pellet, mini-tablet, and mini-capsule. The "particle", "particulate", "pellet", "sphere" or "bead" is generally in diameter or length from about 5 microns to about 5 mm, with a preferred range of 100 microns to 2.5 mm and a more preferred range of 500 microns to 2.0 mm.

The term "core particle", "core bead", "core particulate", core pellet", or "inert core" refers to the internal foundation of a structural unit in any form (e.g., particle, sphere, bead, granule, pellet, mini-tablet, mini-capsule, and particulate) with or without a drug.

The term "excipient", "pharmaceutically acceptable excipient", or "ingredient" refers to those ingredients that are well accepted by the industry and regulatory agencies, such as those listed in handbook of pharmaceutical excipients, monographs published in compendia such as USP-NF, Ph. Eur., IP, Food Chemicals Codex, Code of Federal Regulations (CFR), FDA Inactive Ingredients Guide and in 21 CFR parts 182 and 184 that lists substances that are generally regarded as safe (GRAS) food ingredients, or any novel pharmaceutically acceptable material that is safe for oral administration.

The term "centanafadine particulate phase" refers to a region of centanafadine that is formulated in the form of one or more centanafadine particulates each individually containing centanafadine and one or more release retarding material. The one or more centanafadine particulates collectively release the centanafadine contained therein in a prolonged release form, an enteric release form, or a combination of the prolonged release form and the enteric release form. The term "inner centanafadine particulate phase" refers to an inner centanafadine region of a bi-phasic centanafadine bead that is formulated in the form of centanafadine particulate and comprising centanafadine and one or more release retarding materials. Examples of the "inner centanafadine particulate phase" include "prolonged release centanafadine particulate" or "enteric release centanafadine particulate". A single bi-phasic centanafadine bead releases the centanafadine contained in its inner centanafadine particulate phase in either a prolonged release form or an enteric release form. The plurality of the bi-phasic centanafadine beads releases the centanafadine contained in its inner centanafadine particulate phases in a prolonged release form, an enteric release form, or a combination of the prolonged release form and the enteric release form.

The term "centanafadine continuous phase" refers to a region of centanafadine that is formulated in the form of a coat surrounding the centanafadine particulate phase (i.e., surrounding the one or more individual centanafadine particulates, or one or more inner centanafadine particulate phases) that is comprising centanafadine and optionally one or more excipients. The centanafadine continuous phase normally releases the centanafadine contained therein in a burst release form.

The term "mono-phasic bead" or "centanafadine mono-phasic bead" refers to a prolonged-release centanafadine particulate or enteric release centanafadine particulate without having the centanafadine continuous phase surrounding it and releases the centanafadine contained therein at only one release rate, such as prolonged release or enteric release, respectively.

The term "bi-phasic release," "bi-phasic centanafadine release," or "bi-phasic release characteristics" means to have two-different release rates (characteristics) of the centanafadine, such as the release characteristics of the centanafadine contained in the bi-phasic bead. The term "bi-phasic bead" or "centanafadine bi-phasic bead" refers to a bead, particulate, or pellet that releases the centanafadine contained therein at two different distinct release rates (at the same or different time), i.e., burst release followed by prolonged release or burst release followed by enteric release. The bi-phasic bead contains at least two distinct centanafadine compartments (phases or regions) that are attached or bound to each other to form a single bi-phasic bead; for example, one centanafadine compartment (centanafadine particulate or centanafadine particulate phase) is encased within another centanafadine compartment (centanafadine coat, or centanafadine continuous phase). A single bi-phasic centanafadine bead releases the centanafadine contained therein in the form of a burst release followed by a prolonged release or a burst release followed by an enteric release. The plurality of the bi-phasic centanafadine beads releases the centanafadine contained therein in the form of a burst release followed by a prolonged release, a burst release followed by an enteric release, or a combination of the burst release followed by the prolonged release and the burst release followed by the enteric release.

The term "enteric release" or "enteric release form" includes enteric-burst release, enteric-prolonged release, or enteric-burst-prolonged release.

The term "plurality" refers to greater than one. The term "one or more" refers to at least one. When the term "one or more" is used in conjunction with the term "plurality", then it means at least one but less or equal to the plurality.

The term "burst release", "burst release centanafadine", or "centanafadine in burst release form" refers to a release characteristic of centanafadine that is formulated to dissolve immediately (with no intention of delaying or prolonging) in the gastrointestinal contents when administered, e.g., within a few minutes or less. The term "burst release", "burst release centanafadine", or "centanafadine in burst release form" also means to refer to the amount of centanafadine contained in the "centanafadine continuous phase". The term "burst release", "burst release centanafadine", or "centanafadine in burst release form" also means to refer to the release characteristics of centanafadine contained in the "centanafadine continuous phase", wherein the centanafadine continuous phase releases more than about 75% amount of the centanafadine contained therein in less than about 2 hours (most preferably in less than 1 hour) when measured in 900 ml of an aqueous medium (e.g., any one from water, 0.1N HCl, acetate buffer pH 4.5, and phosphate buffer pH 6.8 or pH 7.2) at a temperature of 37°±1° C. using either USP apparatus 2 (paddle) at 50 RPM (or 75 RPM) or USP apparatus 1 (basket) at 100 RPM (or 150 RPM). The burst release characteristics can be determined by performing the dissolution on placebo particulate(s) coated with an outer burst release centanafadine coat(s). The placebo particulates can be prepared or formulated by replacing the centanafadine with a pharmaceutically inactive water-soluble excipient(s) (such as mannitol, lactose, cellulose derivatives, etc.) in the centanafadine particulate phase or the inner centanafadine particulate phase.

The term "prolonged release", "prolonged release centanafadine", or "centanafadine in prolonged-release form" refers to a release characteristic of centanafadine that is formulated to dissolve or release at a slower rate in any pH of the gastrointestinal contents over a greater period of time, e.g., over the period of 2 hours, over the period of 4 hours, over the period of 6 hours, over the period of 8 hours, over the period of 12 hours, over the period of 16 hours. The term "prolonged release", "prolonged release centanafadine", or "centanafadine in the prolonged-release form" also means to refer to the amount of centanafadine contained in the "prolonged release centanafadine particulate(s)". The term "prolonged release centanafadine particulate" refers to a particulate that comprises a centanafadine and one or more prolonged release material and is intentionally formulated to release the centanafadine contained therein at a slower rate in any pH of the gastrointestinal contents or an aqueous media over a greater period of time, e.g., over the period of 2 hours, over the period of 4 hours, over the period of 6 hours, over the period of 8 hours, over the period of 12 hours, over the period of 16 hours. The term "prolonged release", "prolonged release centanafadine", or "centanafadine in the prolonged-release form" also means to refer to the release characteristic of centanafadine contained in the "prolonged release centanafadine particulate(s) (centanafadine particulate phase)", wherein the prolonged release centanafadine particulate(s), based on the total amount of centanafadine contained therein, releases the centanafadine in an amount of more than about 5% w/w but less than about 65% w/w of the centanafadine at 2 hours (or preferably more than about 15% w/w but less than about 75% w/w of the centanafadine at 4 hours) when measured in 900 ml of an aqueous medium (e.g., any one from water, 0.1N HCl, acetate buffer pH 4.5 and phosphate buffer pH 6.8 or pH 7.2) at a temperature of 37°±1° C. using either USP apparatus 2 (paddle) at 50 RPM (or 75 RPM) or USP apparatus 1 (basket) at 100 RPM (or 150 RPM). The prolonged-release characteristics can be determined by performing the dissolution on the "prolonged release centanafadine particulate(s) only" (the "prolonged release centanafadine particulate(s) only" refers to the prolonged release centanafadine particulate(s) without having (prior to applying) any outer centanafadine continuous phase(s) such as outer burst release coat(s) of centanafadine.

The term "enteric release", "enteric release centanafadine", or "centanafadine in enteric release form" refers to a release characteristic of centanafadine that is formulated to dissolve or release at any rate (whether it is burst release, prolonged release, or a combination thereof such as burst release followed by prolonged release) in the intestinal contents or gastrointestinal contents at a pH greater than about 5, preferably at a pH greater than about 6. The term "enteric release", "enteric release centanafadine", or "centanafadine in enteric release form" also means to refer to the amount of centanafadine contained in "enteric release centanafadine particulate(s)". The term "enteric release centanafadine particulate" refers to a particulate that comprises a centanafadine and one or more enteric material and is intentionally formulated to release the centanafadine contained therein at any rate (whether it is burst release, prolonged release, or a combination thereof such as burst release followed by prolonged release) in the intestinal contents or an aqueous media at a pH greater than about 5, preferably at a pH greater than about 6. The term "enteric release", "enteric release centanafadine", or "centanafadine in enteric release form" also means to refer to the release characteristic of centanafadine contained in "enteric release centanafadine particulate(s) (centanafadine particulate phase)", wherein the "enteric release centanafadine particulate(s)", based on the total amount of centanafadine contained therein, releases the centanafadine at any rate (the burst release, the prolonged release, or the combination thereof) when measured in 900 ml of an aqueous medium with the pH of greater than about 5 (acetate buffer pH 5.5 or phosphate buffer having any pH in the range of 6 to 8, preferably pH 6.8 or 7.2) at a temperature of 37°±1° C. using either USP apparatus 2 (paddle) at 50 RPM (or 75 RPM) or USP apparatus 1 (basket) at 100 RPM (or 150 RPM). The term "enteric release", "enteric release centanafadine", or "centanafadine in enteric release form" also means to refer to the release characteristic of centanafadine contained in "enteric release centanafadine particulate(s) (centanafadine particulate phase)", wherein the "enteric release centanafadine particulate(s)", based on the total amount of centanafadine contained therein, releases the centanafadine in an amount of less than about 25% w/w (preferably less than about 15% w/w, more preferably less than about 10% w/w, most preferably less than about 5% w/w or no release) of the centanafadine at 1 hour (preferably at 2 hours) when measured in 900 ml of an aqueous medium with the pH of less than about 5 (such as 0.1N HCl, 0.01N HCl, 0.001N HCl, acetate buffer pH 4.5 or 5), at a temperature of 37°±1° C. using either USP apparatus 2 (paddle) at 50 RPM (or 75 RPM) or USP apparatus 1 (basket) at 100 RPM (or 150 RPM). The enteric-release characteristics can be determined by performing the dissolution on the "enteric release centanafadine particulate(s) only" (the "enteric release centanafadine particulate(s) only" refers to the enteric release centanafadine particulate(s) without having (prior to applying) any outer centanafadine continuous phase(s) such as outer burst release coat(s) of centanafadine.

The phrase "retard(s) the release of at least about 25% amount of the centanafadine" refers to the release of less than about 75% amount of the centanafadine.

The term "hydro-alcoholic media" refers to an aqueous media containing up to 40% v/v ethanol. For e.g., the mixture of 540 ml (60% v/v) of 0.1N HCl or phosphate buffer with the pH of about 6 to 8+360 ml (40% v/v) of ethanol make 900 ml of 40% v/v ethanolic media (hydro-alcoholic media).

The preferred embodiment of the presently disclosed subject matter provides a centanafadine multiphasic controlled-release pharmaceutical formulation comprising a centanafadine continuous phase surrounding a centanafadine particulate phase, wherein the amount of centanafadine contained in the centanafadine continuous phase facilitates a first release rate of the centanafadine, and the amount of centanafadine contained in the centanafadine particulate phase facilitates the second and/or third release rate of the centanafadine. In certain embodiments, the centanafadine particulate phase is formulated in the form of a plurality of the centanafadine particulates and the centanafadine continues phase is formulated in the form of centanafadine burst release coat surrounding one or more centanafadine particulates of the plurality of the centanafadine particulates.

The preferred embodiment of the presently disclosed subject matter provides a centanafadine multiphasic controlled-release pharmaceutical formulation comprising (1) a centanafadine particulate phase that is formed of a plurality of centanafadine particulates; and (2) a centanafadine continuous phase that is formed surrounding one or more individual centanafadine particulates of the plurality of the centanafadine particulates, wherein the centanafadine particulate phase retards the release of at least about 25% amount of centanafadine contained therein for at least a period of about 2 hours when measured in-vitro in an aqueous media with a pH of below about 5 while the centanafadine continuous phase releases at least about 75% amount of centanafadine contained therein within a period of about 2 hours when measured in-vitro in an aqueous media with a pH of below about 5, wherein the centanafadine multiphasic controlled-release pharmaceutical formulation, based on the total weight of centanafadine contained therein, provide (comprising) about 1%-45% w/w of the centanafadine in a burst release form (burst release centanafadine), and at least one from (1) about 10%-88% w/w of the centanafadine in a prolonged-release form (prolonged release centanafadine), and (2) about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates, wherein the plurality of centanafadine particulates are in the form of centanafadine prolonged release particulates, centanafadine enteric release particulates, or a mixture of centanafadine prolonged release particulates and centanafadine enteric release particulates; and (2) a centanafadine continuous phase that is formed surrounding one or more individual centanafadine particulates of the plurality of the centanafadine particulates, each centanafadine continuous phase formed surrounding the one or more individual centanafadine particulates is in the form of centanafadine burst release coat, wherein the centanafadine particulate phase retards the release of at least about 25% amount of the centanafadine contained therein for at least a period of about 2 hours when measured in-vitro in an aqueous media with a pH of below about 5 while the centanafadine continuous phase releases at least about 75% amount of the centanafadine contained therein within a period of about 2 hours when measured in-vitro in an aqueous media with a pH of below about 5, wherein the centanafadine multiphasic controlled-release pharmaceutical formulation, based on the total weight of centanafadine contained therein, provide (comprising) about 1%-45% w/w of the centanafadine in a burst release form (burst release centanafadine), and at least one from (1) about 10%-88% w/w of the centanafadine in a prolonged-release form (prolonged release centanafadine), and (2) about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates, wherein the plurality of centanafadine particulates comprises, based on the total weight of the plurality of the centanafadine particulates, about 0-100% w/w of centanafadine prolonged release particulates and about 0-100% w/w of centanafadine enteric release particulates; and (2) a centanafadine continuous phase that is formed surrounding one or more individual centanafadine particulates of the plurality of the centanafadine particulates, wherein each centanafadine continuous phase formed surrounding the one or more individual centanafadine particulates is in the form of centanafadine burst release coat, wherein the centanafadine particulate phase retards the release of at least about 25% amount of the centanafadine contained therein for at least a period of about 2 hours when measured in-vitro in an aqueous media with a pH of below about 5 while the centanafadine continuous phase releases at least about 75% amount of the centanafadine contained therein within a period of about 2 hours when measured in-vitro in an aqueous media with a pH of below about 5, wherein the centanafadine multiphasic controlled-release pharmaceutical formulation, based on the total weight of centanafadine contained therein, provide (comprising) about 1%-45% w/w of the centanafadine in a burst release form (burst release centanafadine), and at least one from (1) about 10%-88% w/w of the centanafadine in a prolonged-release form (prolonged release centanafadine), and (2) about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates, wherein the plurality of centanafadine particulates comprises, based on the total weight of the plurality of the centanafadine particulates, about 15-90% w/w of centanafadine prolonged release particulates and about 10-85% w/w of centanafadine enteric release particulates; and (2) a centanafadine continuous phase that is formed surrounding one or more individual centanafadine particulates of the plurality of the centanafadine particulates, wherein each centanafadine continuous phase formed surrounding the one or more individual centanafadine particulates is in the form of centanafadine burst release coat, wherein the centanafadine particulate phase retards the release of at least about 25% amount of the centanafadine contained therein for at least a period of about 2 hours when measured in-vitro in an aqueous media with a pH of below about 5 while the centanafadine continuous phase releases at least about 75% amount of the centanafadine contained therein within a period of about 2 hours when measured in-vitro in an aqueous media with a pH of below about 5, wherein the centanafadine multiphasic controlled-release pharmaceutical formulation, based on the total weight of centanafadine contained therein, provide (comprising) about 1%-45% w/w of the centanafadine in a burst release form (burst release centanafadine), about 10%-88% w/w of the centanafadine in a prolonged-release form (prolonged release centanafadine), and about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates; and (2) a centanafadine continuous phase that is formed surrounding one or more individual centanafadine particulates of the plurality of the centanafadine particulates, wherein the centanafadine particulate phase retards the release of at least about 25% amount of centanafadine contained therein for at least a period of about 2 hours when measured in-vitro in an aqueous media with a pH of below about 5 while the centanafadine continuous phase releases at least about 75% amount of centanafadine contained therein within a period of about 2 hours when measured in-vitro in an aqueous media with a pH of below about 5, wherein each of the one or more individual centanafadine particulates, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg, wherein the centanafadine continuous phase formed surrounding each of the one or more individual centanafadine particulates comprising the centanafadine and one or more excipients in the weight ratio of about 10:0 to 2:8, respectively, and a combination of the centanafadine particulate and the centanafadine continuous phase (the centanafadine particulate encased within the centanafadine continuous phase) has a size in the range of about 55 microns to about 3000 microns and a weight in the range of about 0.015-25 mg, respectively, wherein the plurality of centanafadine particulates (the centanafadine particulate phase) comprises, based on the total weight of the plurality of the centanafadine particulates, about 0-100% w/w of centanafadine prolonged release particulates and about 0-100% w/w of centanafadine enteric release particulates, and each centanafadine continuous phase formed surrounding the one or more individual centanafadine particulates is in the form of centanafadine burst release coat, and wherein the centanafadine multiphasic controlled-release pharmaceutical formulation, based on the total weight of centanafadine contained therein, provide (collectively comprising) about 1%-45% w/w of the centanafadine in a burst release form (burst release centanafadine), and at least one from (1) about 10%-88% w/w of the centanafadine in a prolonged-release form (prolonged release centanafadine), and (2) about 8%-80% w/w of the centanafadine in an enteric release form (enteric release centanafadine).

The preferred embodiment of the presently disclosed subject matter provides a centanafadine multiphasic controlled-release pharmaceutical formulation comprising (1) a centanafadine particulate phase that is formed of a plurality of centanafadine particulates; and (2) a centanafadine continuous phase that is formed surrounding one or more individual centanafadine particulates of the plurality of the centanafadine particulates, wherein the centanafadine particulate phase retards the release of at least about 25% amount of centanafadine contained therein for at least a period of about 2 hours when measured in-vitro in an aqueous media with a pH of below about 5 while the centanafadine continuous phase releases at least about 75% amount of centanafadine contained therein within a period of about 2 hours when measured in-vitro in an aqueous media with a pH of below about 5, wherein each of the one or more individual centanafadine particulates, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg, wherein the centanafadine continuous phase formed surrounding each of the one or more individual centanafadine particulates comprising the centanafadine and one or more excipients in the weight ratio of about 10:0 to 2:8, respectively, and a combination of the centanafadine particulate and the centanafadine continuous phase (the centanafadine particulate encased within the centanafadine continuous phase) has a size in the range of about 55 microns to about 3000 microns and a weight in the range of about 0.015-25 mg, respectively, wherein the plurality of centanafadine particulates (the centanafadine particulate phase) comprises, based on the total weight of the plurality of the centanafadine particulates, about 15-90% w/w of centanafadine prolonged release particulates and about 10-85% w/w of centanafadine enteric release particulates, and each centanafadine continuous phase formed surrounding the one or more individual centanafadine particulates is in the form of centanafadine burst release coat, and wherein the centanafadine multiphasic controlled-release pharmaceutical formulation, based on the total weight of centanafadine contained therein, provide (collectively comprising) about 1%-45% w/w of the centanafadine in a burst release form (burst release centanafadine), about 10%-88% w/w of the centanafadine in a prolonged-release form (prolonged release centanafadine), and about 8%-80% w/w of the centanafadine in an enteric release form (enteric release centanafadine).

In certain embodiments, each of the one or more individual centanafadine particulates surrounded by the centanafadine continuous phase provides a bi-phasic release of the centanafadine contained therein in the sequence of a burst release of centanafadine followed by a prolonged release of centanafadine or an enteric release of centanafadine.

In certain embodiments, the phrase "when measured in-vitro in an aqueous media with a pH of below about 5" refers to in-vitro (dissolution) measurement of cumulative percentage drug release in 900 ml of the aqueous media with the pH of below about 5 (such as 0.1N HCl, 0.01N HCl, 0.001N HCl, acetate buffer pH 4.5 or 5), at a temperature of 37°±1° C. using either USP apparatus 2 (paddle) at 50 RPM (or 75 RPM) or USP apparatus 1 (basket) at 100 RPM (or 150 RPM). The release characteristics of the centanafadine from the centanafadine particulate phase can be determined by performing dissolution on the plurality of the centanafadine particulates prior to applying burst release coat of the centanafadine (the plurality of the centanafadine particulates without having a centanafadine continuous phase). The release characteristics of the centanafadine from the centanafadine continuous phase can be determined by performing dissolution on the plurality of placebo particulate(s) coated with an outer burst release coat(s) of the centanafadine. The plurality of the placebo particulates can be prepared or formulated by replacing the centanafadine with a pharmaceutically inactive water-soluble excipient(s) (such as mannitol, lactose, cellulose derivatives, etc.) in the plurality of the centanafadine particulates.

The preferred embodiment of the presently disclosed subject matter provides a centanafadine multiphasic controlled-release pharmaceutical formulation comprising
  (1) a centanafadine particulate phase that is formed of a plurality of centanafadine particulates, each individual particulate of the plurality of centanafadine particulates provides either a prolonged release of centanafadine or an enteric release of centanafadine, but the plurality of centanafadine particulates collectively provides the prolonged release of centanafadine, the enteric release of centanafadine, or a combination of the prolonged release of centanafadine and the enteric release of centanafadine; and
  (2) a centanafadine continuous phase that is formed surrounding one or more individual centanafadine particulates of the plurality of the centanafadine particulates of the centanafadine particulate phase and provides a burst release of centanafadine,
    wherein each of the one or more individual centanafadine particulates, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg,
    wherein the centanafadine continuous phase formed surrounding each of the one or more individual centanafadine particulates comprising the centanafadine and one or more excipients in the weight ratio of about 10:0 to 2:8, respectively, and a combination of the centanafadine particulate and the centanafadine continuous phase (the centanafadine particulate encased within the centanafadine continuous phase) has a size in the range of about 55 microns to about 3000 microns and a weight in the range of about 0.015-25 mg, respectively,
    wherein the plurality of centanafadine particulates (the centanafadine particulate phase) comprises, based on the total weight of the plurality of the centanafadine particulates, about 0-100% w/w of centanafadine prolonged release particulates and about 0-100% w/w of centanafadine enteric release particulates, and each centanafadine continuous phase formed surrounding the one or more individual centanafadine particulates is in the form of centanafadine burst release coat,
    wherein the centanafadine particulate phase retards the release of at least about 25% amount of centanafadine contained therein for at least a period of about 2 hours when measured in-vitro in an aqueous media with a pH of below about 5 while the centanafadine continuous phase releases at least about 75% amount of centanafadine contained therein within a period of about 2 hours when measured in-vitro in an aqueous media with a pH of below about 5, and
    wherein the centanafadine multiphasic controlled-release pharmaceutical formulation, based on the total weight of centanafadine contained therein, provide (collectively comprising) about 1%-45% w/w of the centanafadine in a burst release form (burst release centanafadine), and at least one from (1) about 10%-88% w/w of the centanafadine in a prolonged-release form (prolonged release centanafadine), and (2) about 8%-80% w/w of the centanafadine in an enteric release form (enteric release centanafadine).

The preferred embodiment of the presently disclosed subject matter provides a centanafadine multiphasic controlled-release pharmaceutical formulation comprising
  (1) a centanafadine particulate phase that is formed of a plurality of centanafadine particulates, each individual particulate of the plurality of centanafadine particulates provides either a prolonged release of centanafadine or an enteric release of centanafadine, but the plurality of centanafadine particulates collectively provides the prolonged release of centanafadine, the enteric release of centanafadine, or a combination of the prolonged release of centanafadine and the enteric release of centanafadine; and
  (2) a centanafadine continuous phase that is formed surrounding one or more individual centanafadine particulates of the plurality of the centanafadine particulates of the centanafadine particulate phase and provides a burst release of centanafadine,
    wherein each of the one or more individual centanafadine particulates, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg,
    wherein the centanafadine continuous phase formed surrounding each of the one or more individual centanafadine particulates comprising the centanafadine and one or more excipients in the weight ratio of about 10:0 to 2:8, respectively, and a combination of the centanafadine particulate and the centanafadine continuous phase (the centanafadine particulate encased within the centanafadine continuous phase) has a size in the range of about 55 microns to about 3000 microns and a weight in the range of about 0.015-25 mg, respectively, wherein the plurality of centanafadine particulates (the centanafadine particulate phase) comprises, based on the total weight of the plurality of the centanafadine particulates, about 15-90% w/w of centanafadine prolonged release particulates and about 10-85% w/w of centanafadine enteric release particulates, and each centanafadine continuous phase formed surrounding the one or more individual centanafadine particulates is in the form of centanafadine burst release coat, wherein the centanafadine particulate phase retards the release of at least about 25% amount of centanafadine contained therein for at least a period of about 2 hours when measured in-vitro in an aqueous media with a pH of below about 5 while the centanafadine continuous phase releases at least about 75% amount of centanafadine contained therein within a period of about 2 hours when measured in-vitro in an aqueous media with a pH of below about 5, and wherein the centanafadine multiphasic controlled-release pharmaceutical formulation, based on the total weight of centanafadine contained therein, provide (collectively comprising) about 1%-45% w/w of the centanafadine in a burst release form (burst release centanafadine), about 10%-88% w/w of the centanafadine in a prolonged-release form (prolonged release centanafadine), and about 8%-80% w/w of the centanafadine in an enteric release form (enteric release centanafadine).

The preferred embodiment of the presently disclosed subject matter provides a centanafadine multiphasic controlled-release pharmaceutical formulation comprising a plurality of centanafadine bi-phasic beads, wherein the plurality of centanafadine bi-phasic beads comprising:

each centanafadine bi-phasic bead, with a size in the range of about 55 microns to about 3000 microns and a weight in the range of about 0.015 mg to 25 mg, comprising an inner centanafadine particulate phase encased within an outer centanafadine continuous phase, wherein the inner centanafadine particulate phase, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg, wherein the outer centanafadine continuous phase comprising the centanafadine and one or more excipients in the weight ratio of about 10:0 to 2:8, respectively, wherein a formation of the outer centanafadine continuous phase surrounding the inner centanafadine particulate phase yield a bi-phasic bead of centanafadine with a size in the range of about 55 microns to about 3000 microns and a weight in the range of about 0.015-25 mg, respectively, wherein the inner centanafadine particulate phase of the plurality of centanafadine bi-phasic beads collectively retards the release of at least about 25% amount of centanafadine contained therein for at least a period of about 2 hours when measured in-vitro in an aqueous media with a pH of below about 5, and the outer centanafadine continuous phase of the plurality of centanafadine bi-phasic beads collectively releases at least about 75% amount of centanafadine contained therein within a period of about 2 hours when measured in-vitro in an aqueous media with a pH of below about 5, wherein, based on the total weight of the plurality of centanafadine bi-phasic beads, about 0-100% the centanafadine bi-phasic beads each comprising a prolonged-release centanafadine in their respective inner centanafadine particulate phase and about 0-100% w/w of the centanafadine bi-phasic beads each comprising an enteric-release centanafadine in their respective inner centanafadine particulate phase, and wherein the centanafadine multiphasic controlled-release pharmaceutical formulation provides (or collectively comprising), based on the total weight of centanafadine contained therein, about 1%-45% w/w of centanafadine in burst release form (burst release centanafadine), and at least one from (1) about 10%-88% w/w of centanafadine in prolonged-release form (prolonged release centanafadine), and (2) about 8%-80% w/w of centanafadine in enteric release form (enteric release centanafadine).

The preferred embodiment of the presently disclosed subject matter provides a centanafadine multiphasic controlled-release pharmaceutical formulation comprising a plurality of centanafadine bi-phasic beads, wherein the plurality of centanafadine bi-phasic beads comprising:

each centanafadine bi-phasic bead, with a size in the range of about 55 microns to about 3000 microns and a weight in the range of about 0.015 mg to 25 mg, comprising an inner centanafadine particulate phase encased within an outer centanafadine continuous phase, wherein the inner centanafadine particulate phase, with a size in the range of about 50 microns to about 2850 microns, comprising the centanafadine and one or more release retarding materials (such as at least one selected from a prolonged release material and an enteric material) in the weight ratio of about 9.9:0.1 to 1:9, respectively, and the combined weight of the centanafadine and the one or more release retarding material is in the range of about 0.010-23 mg, wherein the outer centanafadine continuous phase comprising the centanafadine and one or more excipients in the weight ratio of about 10:0 to 2:8, respectively, wherein a formation of the outer centanafadine continuous phase surrounding the inner centanafadine particulate phase yield a bi-phasic bead of centanafadine with a size in the range of about 55 microns to about 3000 microns and a weight in the range of about 0.015-25 mg, respectively, wherein the inner centanafadine particulate phase of the plurality of centanafadine bi-phasic beads collectively retards the release of at least about 25% amount of centanafadine contained therein for at least a period of about 2 hours when measured in-vitro in an aqueous media with a pH of below about 5, and the outer centanafadine continuous phase of the plurality of centanafadine bi-phasic beads collectively releases at least about 75% amount of centanafadine contained therein within a period of about 2 hours when measured in-vitro in an aqueous media with a pH of below about 5, wherein, based on the total weight of the plurality of centanafadine bi-phasic beads, about 15-90% the centanafadine bi-phasic beads each comprising a prolonged-release centanafadine in their respective inner centanafadine particulate phase and about 10-85% w/w of the centanafadine bi-phasic beads each comprising an enteric-release centanafadine in their respective inner centanafadine particulate phase, and wherein the centanafadine multiphasic controlled-release pharmaceutical formulation provides (or collectively comprising), based on the total weight of centanafadine contained therein, about 1%-45% w/w of centanafadine in burst release form (burst release centanafadine), about 10%-88% w/w of centanafadine in prolonged-release form (prolonged release centanafadine), and about 8%-80% w/w of centanafadine in enteric release form (enteric release centanafadine).

The preferred embodiment of the presently disclosed subject matter provides a centanafadine multiphasic controlled-release pharmaceutical formulation comprising a plurality of centanafadine bi-phasic beads, wherein the plurality of centanafadine bi-phasic beads comprising:

(1) one or more centanafadine bi-phasic beads formulated to provide a burst release followed by a prolonged release of the centanafadine contained therein,
  each of the one or more centanafadine bi-phasic beads, with a size in the range of about 55 microns to about 3000 microns and weight in the range of about 0.015 mg to 25 mg, comprising an inner prolonged release centanafadine particulate phase encased within an outer centanafadine continuous phase,
    wherein the inner prolonged release centanafadine particulate phase, with a size in the range of about 50 microns to about 2850 microns, comprising the centanafadine and one or more prolonged release materials in the weight ratio of about 9.9:0.1 to 1:9, respectively, and the combined weight of the centanafadine and the one or more prolonged release material is in the range of about 0.010-23 mg, wherein the outer centanafadine continuous phase comprising the centanafadine and one or more excipients in the weight ratio of about 10:0 to 2:8, respectively, wherein a formation of the outer centanafadine continuous phase surrounding the inner prolonged release centanafadine particulate phase yield a bi-phasic bead of centanafadine with the size in the range of about 55 microns to about 3000 microns and the weight in the range of about 0.015-25 mg, respectively,
  wherein the inner prolonged release centanafadine particulate phase of the one or more centanafadine bi-phasic beads collectively retards the release of at least about 25% amount of centanafadine contained therein for at least a period of about 2 hours when measured in-vitro in an aqueous media having a pH below about 5, and the outer centanafadine continuous phase of the one or more centanafadine bi-phasic beads collectively releases at least about 75% amount of centanafadine contained therein within a period of about 2 hours when measured in-vitro in an aqueous media having a pH below about 5; and (2) one or more centanafadine bi-phasic beads formulated to provide a burst release followed by an enteric release of the centanafadine contained therein,
  each of the one or more centanafadine bi-phasic beads, with a size in the range of about 55 microns to about 3000 microns and weight in the range of about 0.015 mg to 25 mg, comprising an inner enteric release centanafadine particulate phase encased within an outer centanafadine continuous phase,
    wherein the inner enteric release centanafadine particulate phase, with a size in the range of about 50 microns to about 2850 microns, comprising the centanafadine and one or more enteric release materials in the weight ratio of about 9.9:0.1 to 1:9, respectively, and the combined weight of the centanafadine and the one or more enteric release material is in the range of about 0.010-23 mg, wherein the outer centanafadine continuous phase comprising the centanafadine and one or more excipients in the weight ratio of about 10:0 to 2:8, respectively, wherein a formation of the outer centanafadine continuous phase surrounding the inner enteric release centanafadine particulate phase yield a bi-phasic bead of centanafadine with the size in the range of about 55 microns to about 3000 microns and the weight in the range of about 0.015-25 mg, respectively,
  wherein the inner enteric release centanafadine particulate phase of the one or more centanafadine bi-phasic beads collectively retards the release of at least about 25% amount of centanafadine contained therein for at least a period of about 2 hours when measured in-vitro in an aqueous media having a pH below about 5, and the outer centanafadine continuous phase of the one or more centanafadine bi-phasic beads collectively releases at least about 75% amount of centanafadine contained therein within a period of about 2 hours when measured in-vitro in an aqueous media having a pH below about 5, wherein, based on the total weight of the plurality of centanafadine bi-phasic beads, about 15-90% the centanafadine bi-phasic beads are formulated to provide the burst release followed by the prolonged release of the centanafadine contained therein and about 10-85% w/w of the centanafadine bi-phasic beads are formulated to provide the burst release followed by the enteric release of the centanafadine contained therein, wherein the centanafadine multiphasic controlled-release pharmaceutical formulation provides (or collectively comprising), based on the total weight of centanafadine contained therein, about 1%-45% w/w of centanafadine in burst release form (burst release centanafadine), about 10%-88% w/w of centanafadine in prolonged-release form (prolonged release centanafadine), and about 8%-80% w/w of centanafadine in enteric release form (enteric release centanafadine).

In certain embodiments, each centanafadine bi-phasic bead provides a release of the centanafadine contained therein in the sequence of a burst release of centanafadine followed by any of a prolonged release of centanafadine or an enteric release of centanafadine.

In certain embodiments, the centanafadine continuous phase (centanafadine burst release coat) is formed surrounding the centanafadine particulates (the centanafadine prolonged release particulates or the centanafadine enteric release particulates), wherein a weight ratio of the centanafadine contained in the centanafadine particulates and the centanafadine continuous phase is in the range of about 99:1 to about 50:50. In certain embodiments, the inner centanafadine particulate phase (the inner centanafadine prolonged release particulate phase or the inner centanafadine enteric release particulate phase) is encased within the outer centanafadine continuous phase (centanafadine burst release coat), wherein a weight ratio of the centanafadine contained in the inner centanafadine particulate phase and the outer centanafadine continuous phase is in the range of about 99:1 to about 50:50.

In certain embodiments, the centanafadine continuous phase (centanafadine burst release coat(s)) is formed surrounding the centanafadine particulates (the centanafadine prolonged release particulates or the centanafadine enteric release particulates), wherein the amount of the centanafadine contained in the centanafadine continuous phase is in the range of about 1-100% w/w of total amount of the centanafadine contained in the centanafadine particulates. In certain embodiments, the inner centanafadine particulate phase (the inner centanafadine prolonged release particulate phase or the inner centanafadine enteric release particulate phase) is encased within the outer centanafadine continuous phase (centanafadine burst release coat), wherein the amount of the centanafadine contained in the outer centanafadine continuous phase is in the range of about 1-100% w/w of total amount of the centanafadine contained in the inner centanafadine particulate phase.

In certain embodiments, the term "release retarding material" refers to a prolonged release material, an enteric material or combination thereof.

In certain embodiments, the centanafadine particulate or the inner centanafadine particulate phase is formulated in the form of a prolonged release centanafadine particulate that releases the centanafadine contained therein in the prolonged release form. The prolonged release centanafadine particulate (in a reservoir type of formulation) comprising: (1) a core bead comprising the centanafadine, and, optionally, one or more excipients; and (2) a prolonged release coat surrounding the core bead, the prolonged release coat comprising one or more prolonged release material (release retarding material), and, optionally, one or more excipients; wherein the combination of the core bead and the prolonged release coat has the total size in the range of about 50 microns to about 2850 microns and the total weight in the range of about 0.010 to 23 mg. In certain embodiments, the prolonged release coat comprises the one or more prolonged release materials in an amount of about 10-100% w/w of the total weight of the prolonged release coat. The core bead can be used or prepared in the form of (a) a particle of the centanafadine (a pure drug substance); (b) a matrix particle of the centanafadine, wherein the centanafadine is embedded or dispersed within a matrix of the one or more pharmaceutically acceptable excipient; or (c) a coat of the centanafadine surrounding an inert core, wherein the coat comprising the centanafadine and, optionally, one or more excipients. The prolonged release centanafadine particulate (in a matrix type of formulation) comprising the centanafadine that is embedded or dispersed within a matrix of one or more prolonged release material, wherein the matrix (the matrix formulation) is formulated as a matrix particulate or a matrix coat surrounding an inert core, and has the total size in the range of about 50 microns to about 2850 microns and the total weight in the range of about 0.010 to 23 mg. In certain embodiments, an amount of the one or more prolonged release material contain in the prolonged release centanafadine particulate(s) or the pharmaceutical formulation is any from about 0.5-65% w/w of the total weight of prolonged-release centanafadine particulate(s) or the pharmaceutical formulation, respectively.

In certain embodiments, the centanafadine particulate or the inner centanafadine particulate phase is formulated as an enteric-prolonged release centanafadine particulate that releases the centanafadine contained therein in the enteric-prolonged release form. The term "enteric-prolonged release form" refers to the release characteristics of centanafadine contained in the enteric-prolonged release centanafadine particulate. The term "enteric-prolonged release centanafadine particulate" refers to a particulate of centanafadine that is intentionally designed to initiate the release of the centanafadine contained therein in prolonged-release form when exposed to an aqueous media or gastrointestinal fluid with a pH of only above 5 (preferably a pH of above 6.8, media such as acetate buffer pH 5.5 or phosphate buffer having any pH in the range of about 6 to 8). The "enteric-prolonged release particulate" temporarily retard (delays) the initiation of the release of the centanafadine contained therein in prolonged-release form (for e.g., for the period of about 1 or 2 hours) in an aqueous media or gastric fluid with a pH of below about 5 (media such as 0.1N HCl, 0.01N HCl, 0.001N HCl, or acetate buffer pH 4.5). The enteric-prolonged release centanafadine particulate that releases the centanafadine contained therein in the enteric-prolonged release form comprising: (1) a prolonged release centanafadine particulate; and (2) an enteric coat surrounding the prolonged release centanafadine particulate, the enteric coat comprising one or more enteric materials; and, optionally, one or more excipients, wherein the combination of the prolonged release centanafadine particulate and the enteric coat has the total size in the range of about 50 microns to about 2850 microns and the total weight in the range of about 0.010 to 23 mg. In certain embodiments, the enteric coat comprises the one or more enteric materials in an amount of about 10-100% w/w of the total weight of the enteric coat. In certain embodiments, an amount of the one or more enteric materials contain in the enteric-prolonged release centanafadine particulate(s) or the pharmaceutical formulation is any from about 0.5-65% w/w of the total weight of enteric-prolonged release centanafadine particulate(s) or the pharmaceutical formulation, respectively. The prolonged-release centanafadine particulate can be prepared as previously described in the present application.

In certain embodiments, the centanafadine particulate or the inner centanafadine particulate phase is formulated as an enteric-burst release centanafadine particulate that releases the centanafadine contained therein in the enteric-burst release form. The term "enteric-burst release form" refers to the release characteristics of centanafadine contained in the enteric-burst release centanafadine particulate. The term "enteric-burst release centanafadine particulate" refers to a particulate of centanafadine that is intentionally designed to release more than about 75% amount of centanafadine contained therein in burst-release form within a period of about 2 hours (preferably within a period of 1 hour) when exposed to an aqueous media or gastrointestinal fluid with a pH of only above 5 (preferably a pH of above 6.8, media such as acetate buffer pH 5.5 or phosphate buffer having any pH in the range of 6 to 8). The "enteric-burst release particulate" retard (delay) release of more than about 75% amount of centanafadine contained therein for a period of about 2 hours (preferably for a period of 1 hour) when exposed to an aqueous media or gastric fluid with a pH of below 5 (media such as 0.1N HCl, 0.01N HCl, 0.001N HCl, or acetate buffer pH 4.5). The enteric-burst release centanafadine particulate that releases the centanafadine contained therein in the enteric-burst release form comprising: (1) a burst release centanafadine particulate; and (2) an enteric coat surrounding the burst release centanafadine particulate, the enteric coat comprising one or more enteric material; and, optionally, one or more excipients, wherein the combination of the burst release centanafadine particulate and the enteric coat has the total size in the range of about 50 microns to about 2850 microns and the total weight in the range of about 0.010 to 23 mg. The burst-release centanafadine particulate can be used or prepared in the form of (a) a particle of the centanafadine (a pure drug substance); (b) a matrix particle of the centanafadine, wherein the centanafadine is embedded or dispersed within a matrix of the one or more pharmaceutically acceptable excipient; or (c) a coat of the centanafadine surrounding an inert core, wherein the coat comprising the centanafadine and, optionally, one or more excipients. In certain embodiments, the enteric coat comprises the one or more enteric materials in an amount of about 10-100% w/w of the total weight of the enteric coat. In certain embodiments, an amount of the one or more enteric materials contain in the enteric-burst release centanafadine particulate(s) or the pharmaceutical formulation is any from about 0.5-65% w/w of the total weight of enteric-burst release centanafadine particulate(s) or the pharmaceutical formulation, respectively.

In certain embodiments, the centanafadine particulate or the inner centanafadine particulate phase is formulated as an enteric-burst-prolonged release centanafadine particulate that releases the centanafadine contained therein in the enteric-burst-prolonged release form. The term burst-prolonged release refers to a "burst release followed by prolonged release". The term "enteric-burst-prolonged release form" refers to the release characteristics of centanafadine contained in the enteric-burst-prolonged release centanafadine particulate. The term "enteric-burst-prolonged release centanafadine particulate" refers to a particulate of centanafadine that is intentionally designed to first initiate the burst release followed by prolonged release of the centanafadine contained therein when exposed to an aqueous media or gastrointestinal fluid with a pH of only above 5 (preferably a pH of above 6.8, media such as acetate buffer pH 5.5 or phosphate buffer having any pH in the range of 6 to 8). The "enteric-burst-prolonged release particulate" temporarily retard (delays) the initiation of the release of the centanafadine contained therein (for e.g., for the period of about 1 or 2 hours) in an aqueous media or gastric fluid with a pH of below about 5 (media such as 0.1N HCl, 0.01N HCl, 0.001N HCl, or acetate buffer pH 4.5). The enteric-burst-prolonged release centanafadine particulate comprising (1) a prolonged release centanafadine particulate; (2) a burst release coat of centanafadine surrounding the prolonged release centanafadine particulate, wherein the burst release coat of centanafadine comprising the centanafadine; and optionally, one or more excipients; and (3) an enteric coat surrounding the burst release coat of centanafadine, wherein the enteric coat comprising one or more enteric material; and, optionally, one or more excipients, wherein the combination of the prolonged release centanafadine particulate, the burst release coat of centanafadine, and the enteric coat has the total size in the range of about 50 microns to about 2850 microns and the total weight in the range of about 0.010 to 23 mg. In certain embodiments, the enteric coat comprises the one or more enteric materials in an amount of about 10-100% w/w of the total weight of the enteric coat. In certain embodiments, an amount of the one or more enteric materials contain in the enteric-burst-prolonged release centanafadine particulate(s) or the pharmaceutical formulation is any from about 0.5-65% w/w of the total weight of enteric-burst-prolonged release centanafadine particulate(s) or the pharmaceutical formulation, respectively. The prolonged-release centanafadine particulate can be prepared as previously described in the present application.

In certain embodiments, the core bead can be used or prepared in the form of (a) a particle of the centanafadine (a pure drug substance); (b) a matrix particle of the centanafadine, wherein the centanafadine is embedded or dispersed within a matrix of the one or more pharmaceutically acceptable excipient; or (c) a coat of the centanafadine surrounding an inert core, wherein the coat comprising the centanafadine and, optionally, one or more excipients. In certain embodiments, the inert core (with or without comprising drug) includes a particle, bead, granule, or sphere of one or more pharmaceutically acceptable excipients, such as a sugar sphere, microcrystalline cellulose sphere, silicon sphere, ion-exchange resin, sphere of excipients such as in the form of granules, beads, pellets, spheres, mini-tablets.

In certain embodiments, the centanafadine particulate or the inner centanafadine particulate phase further (optionally) comprises an intermediate or seal coat before or after the prolonged release coat or enteric coat. The intermediate or seal coat comprises at least one of the water-soluble material and water-insoluble material. In certain embodiments, the centanafadine particulate further (optionally) comprises a film or tase-masking coat surrounding the prolonged release coat, enteric coat, or centanafadine continuous phase (a burst release coat of centanafadine). The film or tase-masking coat comprises at least one of the water-soluble material.

In certain embodiments, the centanafadine continuous phase or the outer centanafadine continuous phase is formulated as a burst release coat of centanafadine (centanafadine burst release coat or burst release centanafadine) surrounding the centanafadine particulate or the inner centanafadine particulate phase, the burst release coat of centanafadine comprising a centanafadine and optionally one or more excipients, and a combination of the burst release coat of centanafadine (the centanafadine continuous phase or the outer centanafadine continuous phase) and the centanafadine particulate or the inner centanafadine particulate phase has a size in the range of about 55 microns to about 3000 microns and weight in the range of about 0.015-25 mg. In certain embodiments, the amount of the centanafadine contained in the burst-release coat of the centanafadine (centanafadine continuous phase, the outer centanafadine continuous phase, or the intermediate burst release coat of centanafadine included in enteric-burst-prolonged release centanafadine particulate) is not less than about 5%, preferably not less than about 15%, more preferably not less than about 35%, and most preferably not less than about 50% w/w of the total weight of the burst-release coating components, wherein the burst-release coating components include the centanafadine, and, optionally, the one or more pharmaceutically acceptable excipients. In certain embodiments, the amount of the centanafadine contained in each individual centanafadine continuous phase (burst-release coat of the centanafadine surrounding any one centanafadine particulate or inner centanafadine particulate phase, or the intermediate burst release coat of centanafadine included in enteric-burst-prolonged release centanafadine particulate) is in the range from about 0.001 mg-5.0 mg, preferably 0.01 mg-3.5 mg and most preferably 0.05 mg-2.5 mg. In certain embodiments, the centanafadine continuous phase or outer centanafadine continuous phase of the plurality of the centanafadine particulates or centanafadine bi-phasic beads, respectively (one or more burst-release coats of the centanafadine formed surrounding the one or more centanafadine particulates or inner centanafadine particulate phases, respectively), comprising the centanafadine in amounts of about 1 mg-500 mg, preferably 2.5 mg-250 mg, and most preferably 5 mg-200 mg.

In certain embodiments, each centanafadine particulate or each inner centanafadine particulate phase of the pharmaceutical formulation comprising the centanafadine in any amount from about 0.001 mg-23.0 mg, preferably 0.100 mg-15 mg, and most preferably 0.15 mg-5 mg. In certain embodiments, the total amount of the centanafadine contained in the centanafadine particulate phase (the plurality of the centanafadine particulates such as one or more centanafadine prolonged release centanafadine particulates or one or more centanafadine enteric release particulates) or the inner centanafadine particulate phase of the plurality of bi-phasic centanafadine beads is in the range from about 10 mg-1000 mg, preferably 25 mg-750 mg, and most preferably 35 mg-350 mg.

In certain embodiments, each centanafadine particulate or each inner centanafadine particulate phase of the pharmaceutical formulation comprising the one or more prolonged release materials, the one or more enteric materials, or a combination thereof in any amount from about 0.002 mg-22.0 mg, preferably 0.200 mg-12 mg, and most preferably 0.25 mg-4.5 mg. In certain embodiments, the total amount of the one or more prolonged release materials, the one or more enteric materials, or a combination thereof contained in the centanafadine particulate phase (the plurality of the centanafadine particulates) or the inner centanafadine particulate phase of the plurality of bi-phasic centanafadine beads is in the range from about 2.5 mg-750 mg, preferably 5 mg-500 mg, more preferably 7.5 mg-250 mg, and most preferably 10 mg-200 mg.

In certain embodiments, the prolonged release material, also refers to as "release retarding material", is a water-insoluble ingredient. In certain embodiments, the prolonged release material is a water-soluble ingredient. In certain embodiments, the prolonged release material is a mixture of a water-insoluble ingredient and a water-soluble ingredient, wherein a % weight ratio of the water-insoluble ingredient to the water-soluble ingredient is any from about 20:80 to about 99.9:0.1, preferably from about 40:60 to about 99:1, more preferably from about 50:50 to about 96:4, and most preferable from about 60:40 to about 95:5, respectively.

In certain embodiments, the term "water-insoluble ingredient" refers to a component that is insoluble in water. The water-insoluble ingredient includes wax, oil, and water-insoluble polymer. The suitable water-insoluble ingredient includes, but are not to be limited, cellulose derivatives include cellulose acetate, cellulose acetate butyrate, cellulose triacetate, ethyl cellulose; wax include microcrystalline wax, beeswax, glycowax, castor wax, carnauba wax, glycerol monostearate, glycerol palmitostearate; oil include hydrogenated vegetable oil, hydrogenated castor oil, vegetable oil, stearyl alcohol, acetylated hydrogenated soybean oil glycerides, castor oil; glycerol behenic acid ester, glyceryl behenate, glyceryl monooleate, glyceryl monostearate, propylene glycol monostearate, cetyl alcohol, natural and synthetic glycerides, fatty acids, fatty alcohol, lipid, methacrylic acid derivatives such as polymethacrylate and its copolymer (such as polymer under brand name Eudragit® such as eudragit RS, eudragit RL, eudragit NE, eudragit NM), Polyethylene Glycol (PEG) glyceryl esters, poly(ethyl acrylate-co-methyl methacrylate) ethyl acrylate methyl methacrylate copolymer, poly (ethyl acrylate-co-methyl methacrylate-cotrimethylammonioethyl methacrylate chloride), polyvinyl acetate, copolymers of vinyl pyrrolidone and vinyl acetate; vinyl acetate and copolymer thereof, ethyl vinyl acetate, modified starch like pregelatinised starch, polylactic acid or polyglycolic acid and copolymers thereof, methacrylates, cocoa butter, macrogol stearate, diethylene glycol monostearate, polyoxyethylene 50 stearate, mixtures thereof, and cationic copolymers of ethyl acrylate, methyl methacrylate, and methacrylic acid ester with quaternary ammonium groups (e.g. Eudragit® RL and Eudragit® RS polymers).

In certain embodiments, the term "water-soluble ingredient" refers to a component that is soluble in water. The water-soluble ingredient includes water-soluble gums, water-soluble polymers, polysaccharides, protein or polypeptides, sugar, acid, base, salt, starch or starch derivatives, and pH-sensitive water-soluble material.

The preferred water-soluble gums include, but are not limited to, xanthan gum, acacia gum, diutan gum, tragacanth, gellan gum, guar gum, fenugreek gum, locust bean gum, pullulan, welan gum, etc.

The preferred water-soluble polymer includes, but not limited to, cellulose derivatives such as carboxymethyl cellulose, cellulose ether (such as hydroxyethyl cellulose, hydroxypropylmethyl cellulose, hydroxypropyl cellulose, etc), polyalkylene oxide and its co-polymer such as polyethylene oxide, copolymer of ethylene oxide-propylene oxide, polycarboxylic acid such as polyacrylic acid, polyolefinic alcohol (such as polyvinyl alcohol), or a polyvinyl lactam such as, e.g., polyvinylpyrrolidone, polyvinyl caprolactam, alginic acid and its derivative, methacrylic acid and its copolymer (such as polymer under brand name Eudragit® like Eudragit® E grades), polyacrylic acid and copolymer thereof (such as carbomer); protein or polypeptide such as gelatin, albumin, polylysine, soy protein; starch or its derivative; and like.

The polysaccharides are polymeric carbohydrate molecules composed of long chains of monosaccharide units bound together by glycosidic linkages and on hydrolysis give the constituent monosaccharides or oligosaccharides. They range in structure from linear to highly branched. Examples include storage polysaccharides such as starch and glycogen, and structural polysaccharides such as cellulose and chitin.

The preferred sugars include dextrose, glucose, arabinose, ribose, arabinose, xylose, lyxose, xylol, allose, altrose, inositol, glucose, sorbitol, mannose, gulose, glycerol, idose, galactose, talose, trehalose, mannitol, erythritol, ribitol, xylitol, maltitol, isomalt, lactitol, sucrose, raffinose, maltose, fructose, lactose, dextrin, dextran, amylase and xylan.

The preferred water-soluble salts include sodium chloride, potassium chloride, calcium chloride or magnesium chloride, lithium chloride, lithium, sodium or potassium hydrogen phosphate, lithium, sodium or potassium dihydrogen phosphate, salts of organic acids such as sodium or potassium acetate, sodium bicarbonate, magnesium succinate, sodium benzoate, sodium citrate or sodium ascorbate.

The preferred acids include ascorbic acid, 2-benzene carboxylic acid, benzoic acid, fumaric acid, citric acid, maleic acid, serbacic acid, sorbic acid, edipic acid, edetic acid, glutamic acid, toluene sulfonic acid, water-soluble amino acids such as glycine, leucine, alanine, or methionine and tartaric acid; and like.

The preferred pH-sensitive water-soluble material includes amylose acetate phthalate, cellulose acetate phthalate, cellulose acetate succinate, cellulose acetate trimellitate, carboxymethyl ethylcellulose, co-polymerized methacrylic acid/methacrylic acid methyl esters, co-polymerized methacrylic acid/methyl methacrylate, co-polymerized methylacrylate/methyl methacrylate/methacrylic acid, hydroxypropyl methylcellulose acetate succinate, hydroxypropyl methylcellulose phthalate, polyvinyl acetate phthalate, styrene maleic acid copolymer, styrene vinylpyridine copolymer; one or more materials selected from a copolymer of methacrylic acid, methyl methacrylate, and methyl acrylate, methacrylic acid-acrylate copolymer, and a methacrylic acid-acrylate copolymer; a copolymer of methacrylic acid, methyl methacrylate, and methyl acrylate; a copolymer of methyl acrylate, methyl methacrylate, and methacrylic acid, e.g. in a molar ratio of about 7:3:1 (e.g., Eudragit® FS 30 D). Eudragit® FS 30 D is poly(methyl acrylate-CO-methyl methacrylate-CO-methacrylic acid [CAS 26936-24-3] available from Evonik Industries. More specifically, the preferred pH-sensitive water-soluble polymer includes EUDRAGIT® FS 30 D (poly (methyl acrylate-co-methyl methacrylate-co-methacrylic acid)), EUDRAGIT® L 30 D-55, EUDRAGIT® L and EUDRAGIT® S (poly (methacrylic acid-co-methyl methacrylate)), hydroxypropyl methylcellulose acetate succinate, hydroxypropyl methylcellulose phthalate, cellulose acetate phthalate, shellac, zein, and combinations thereof.

In certain embodiments, the water-soluble materials can be used as a pore former or flux enhancer in the matrix, the prolonged-release coat, or the enteric coat.

In certain embodiments, the enteric material or the enteric release material, also refers to as "release retarding material", is a pH-sensitive water soluble material that is soluble at pH above about 5, more specifically pH above about 6. Examples of the various pH-sensitive water-soluble materials are previously described in the present application.

In certain embodiments, the excipient or pharmaceutically acceptable excipients, depending on their functionality in the pharmaceutical formulation, include but are not limited to, filler, diluent, disintegrant, anti-tacking agent, binder, glidant, surfactant, wetting agent, lubricant, anti-oxidant, plasticizer, sweetener, coloring agent, sugar, salt, acid, and osmotic agent.

The preferred fillers or diluents include, but are not limited to, cellulose derivatives (such as microcrystalline cellulose), mono, di, or tri-basic calcium phosphate, sugar, carbohydrate, starch derivatives, acid or base, and like. Filler or diluent refers to material that is used to increase the bulk volume of a pharmaceutical formulation and/or to improve the content uniformity of the pharmaceutical formulation. The disintegrant may be highly/rapidly swellable, moderately swellable or slowly swellable such as vinylpyrrolidone polymers such as crospovidon, cellulose and cellulose derivatives, sodium starch glycolate, starch and starch derivatives, resins, and like. Suitable anti-tacking agent is selected from the group consisting of, but are not limited to, stearates, stearic acid, vegetable oil, waxes, a blend of magnesium stearate and sodium lauryl sulfate, boric acid, surfactants, sodium benzoate, sodium acetate, sodium chloride, DL-Leucine, polyethylene glycol, sodium oleate, sodium lauryl sulfate, magnesium lauryl sulfate, talc, silicon dioxide, silica, corn starch, amorphous silicon dioxide, syloid, metallic stearates, Vitamin E, Vitamin E TPGS, silica and combinations thereof.

Suitable binders include, but are not to be limited, cellulose derivatives include, but are not limited to be, methylcellulose, hydroxypropyl methylcellulose, hydroxyethyl cellulose, hydroxypropyl cellulose, hydroxyethyl methylcellulose, ethyl hydroxyethylcellulose, ethyl methyl cellulose, hydroxymethyl cellulose, hydroxymethyl propyl cellulose, sodium carboxymethylcellulose, polyacrylamide derivatives, methacrylic acid derivatives, vinyl pyrrolidone polymers such as polyvinylpyrrolidone, a starch derivative, polyalkylene oxide and copolymer thereof, alkylene oxide homopolymers, gums of plant, animal, mineral or synthetic origin, polyacrylic acid and copolymer thereof, polyvinyl alcohols, polyethylene glycol, poloxamer, and mixtures thereof. Suitable glidants and lubricants may be incorporated such as stearic acid, metallic stearates, talc, waxes, glycerides with high melting temperatures, colloidal silica, sodium stearyl fumarate, polyethylene glycols, and alkyl sulfates. Suitable plasticizers include but are not limited to, triacetin, triethyl acetate, acetylated monoglyceride, olive oil, acetyl tributyl citrate, acetyl triethyl citrate, glycerin, sorbitol, polyethylene glycol, polypropylene glycol and like. Stabilizers, such as antioxidants to inhibit or retard oxidative drug decomposition during storage of the pharmaceutical composition. Natural or synthetic sweeteners include but are not limited to, mannitol, sorbitol, saccharose, saccharine, aspartame, acesulfame K, or cyclamate. Preferred coloring agent includes D&C dye/lake, FD&C dye, an FD&C lake, caramel, ferric oxide, a natural coloring agent, and a combination thereof. The amount of coloring agent used will vary as desired. Preferably, the composition is non-toxic, edible, stable in light and air, and free of potential hazards to human health. The osmotic agent includes sugar and salts as described above.

Surfactants and Wetting agents include, but are not limited to, heptadecaethylene oxycetanol, lecithins, sorbitol monooleate, polyoxyethylene sorbitol monooleate, polyoxyethylene stearate, polyoxyethylen sorbitan monolaurate, benzalkonium chloride, nonoxynol 10, oxtoxynol 9, polysorbates for example 20, 40, 60 or 80, sorbitan monopalmitate, sodium salts of fatty alcohol-sulfates such as sodium lauryl sulfate, sodium dodecylsulfate, sodium salts of sulfosuccinates such as sodium dioctylsulfosuccinate, partially esters of fatty acids with alcohols such as glycerine monostearate, partially esters of fatty acids with sorbitans such as sorbitan monolaurate, partially esters of fatty acids with polyhydroxyethylene sorbitans such as polyethyleneglycol sorbitan monolaurate, -monostearate or -monooleate, ethers of fatty alcohols with polyhydroxyethylene, esters of fatty acids with polyhydroxyethylene, copolymers of ethylenoxide and propylenoxide (Pluronic®) and ethoxylated triglycerides.

Depending on the functionality, the tentative range for the concentration of pharmaceutically acceptable excipients to be used in the pharmaceutical formulation is 0.0001% w/w to about 65% w/w of the total weight of the pharmaceutical formulation, or the total weight of the centanafadine continuous phase or the total weight of the centanafadine particulate phase. Handbook of Pharmaceutical Excipients, 9$^{th}$ Edition, Edited by Paul J Sheskey, Bruno C Hancock, Gary P Moss, and David J Goldfarb, which herein incorporated entirely, provides more information on the functionality and proportion of use for many pharmaceutical excipients to be used in the present disclosure.

The above-listed ingredients are for information only, which does not limit the scope of the present disclosure. Any ingredient that is used in pharmaceutical formulation and fulfills the objective of the subject matter of the present disclosure is within the scope of the present disclosure.

In certain embodiments, the burst-release centanafadine coat comprises only centanafadine (free from any pharmaceutically acceptable excipient).

In certain embodiments, the prolonged release centanafadine particulate (in a matrix type of formulation) is prepared by embedding or dispersing the centanafadine within a matrix of one or more prolonged release materials, wherein the matrix is prepared in the form of a matrix particle or a matrix coat surrounding the core bead or inert core. In certain embodiments, the matrix particles or the matrix coats, comprising a mixture of the centanafadine with the one or more one or more prolonged release materials (the centanafadine embedded or dispersed within the matrix of one or more one or more prolonged release materials), is capable of retarding or prolonging the dissolution of the centanafadine contained therein into the aqueous medium (dissolution media) when it subjected to in-vitro dissolution as described above. The matrixing material (such as one or more prolonged release material) useful for these embodiments are generally water-insoluble materials, slowly water-soluble material, or a combination of water-insoluble materials and water-soluble materials. If needed, the matrix may optionally be formulated with water-soluble materials, which can be used as binders or as permeability-modifying agents in the matrix. In certain embodiments, the prepared prolonged release centanafadine particulate(s) are further coated with an optional prolonged release coat, wherein the prolonged release coat comprises water-insoluble materials, slowly water-soluble material, or a combination of water-insoluble materials, and water-soluble materials.

In certain embodiments, the prolonged release centanafadine particulate(s) are prepared by applying a prolonged release coat(s) surrounding a core particle(s) or bead(s) of the centanafadine, wherein the prolonged release coat(s), optionally, further comprising the one or more pharmaceutically acceptable excipients, in addition to the one or more prolonged release materials. In certain embodiments, the applied prolonged release coat(s) surrounding the core particle(s) or bead(s) of the centanafadine is capable of retarding or prolonging the dissolution of the centanafadine from the prolonged release centanafadine particulate(s) into an aqueous medium when subjected to in-vitro dissolution as described above. The prolonged release material useful to prepare the prolonged release coat includes water-insoluble materials, slowly water-soluble materials, or a combination of water-insoluble materials and water-soluble materials. If needed, the water-soluble materials in an appropriate amount can be added as permeability-modifying agents in the prolonged release coat to achieve the desired prolonged-release profile of centanafadine. In certain embodiments, the centanafadine can also be used as a soluble material or permeability-modifying agent in the prolonged release coat to achieve the desired extended-release profile of centanafadine. In certain embodiments, the prepared prolonged release centanafadine particulate(s) are, optionally, further coated with a second prolonged release coat, wherein the second prolonged release coat comprises water-insoluble materials, slowly water-soluble material, or a combination of water-insoluble materials, and water-soluble materials. In certain embodiments, the core particle(s) or bead(s) of the centanafadine comprises the centanafadine, and optionally, at least one or more pharmaceutically acceptable excipients, wherein the core particle(s) or bead(s) of the centanafadine can be formulated or used in the form of (a) a particle of the centanafadine as such (a pure drug substance); (b) a matrix particle of the centanafadine, wherein the centanafadine is embedded within a matrix of the one or more pharmaceutically acceptable excipient; or (c) a coat of the centanafadine surrounding an inert core. In certain embodiments, the core particle(s) or bead(s) of the centanafadine can be prepared by applying the coat of the centanafadine surrounding an inert core(s) or compressing the mixture of the centanafadine and one or more excipients on a tablet press to form minitablet(s) of centanafadine.

In certain embodiments, the bi-phasic bead comprising the inner centanafadine particulate phase encased within the outer centanafadine continuous phase, wherein the inner centanafadine particulate phase is formulated as prolonged release centanafadine particulate and the outer centanafadine continuous phase is formulated as burst release centanafadine.

In certain embodiments, the bi-phasic bead comprising the inner centanafadine particulate phase encased within the outer centanafadine continuous phase, wherein the inner centanafadine particulate phase is formulated as enteric release centanafadine particulate (enteric-prolonged release centanafadine particulate, enteric-burst release centanafadine particulate, or enteric-burst-prolonged release centanafadine particulate), and the outer centanafadine continuous phase is formulated as burst release centanafadine.

In certain embodiments, the centanafadine continuous phase is formed surrounding the one or more individual centanafadine particulates, wherein the at least one centanafadine particulate is formulated as prolonged release centanafadine particulate, and the centanafadine continuous phase is formulated as burst release centanafadine.

In certain embodiments, the centanafadine continuous phase is formed surrounding the one or more individual centanafadine particulates, wherein the at least one centanafadine particulate is formulated as enteric release centanafadine particulate (enteric-prolonged release centanafadine particulate, enteric-burst release centanafadine particulate, or enteric-burst-prolonged release centanafadine particulate), and the centanafadine continuous phase is formulated as burst release centanafadine.

In certain embodiments, the centanafadine continuous phase is formed surrounding the two or more individual centanafadine particulates, wherein the at least one centanafadine particulate is formulated as prolonged release centanafadine particulate and the at least another centanafadine particulate is formulated as enteric release centanafadine particulate (enteric-prolonged release centanafadine particulate, enteric-burst release centanafadine particulate, or enteric-burst-prolonged release centanafadine particulate), and the centanafadine continuous phase is formulated as burst release centanafadine.

In certain embodiments, the amount of the centanafadine contained in the centanafadine particulate phase (centanafadine particulates in any form such as inner centanafadine particulate phase, prolonged release centanafadine particulates, enteric-prolonged release centanafadine particulates, enteric-burst release centanafadine particulates, or enteric-burst-prolonged release centanafadine particulates) and the centanafadine continuous phase (burst release centanafadine coat or burst release coat of centanafadine or intermediate burst release coat of centanafadine) is any from the weight ratio of about 99:1 to 40:60.

In certain embodiments, the centanafadine is embedded within a matrix of at least one release retarding material (such as at least one selected from a prolonged release material and an enteric material) and/or one or more pharmaceutically acceptable excipients to form a matrix particle. A preferred process for manufacturing matrix particles is the extrusion/spheronization process. For this process, the centanafadine is wet-massed with matrix material [such as the at least one release retarding material and/or one or more pharmaceutically acceptable excipients (such as binder)], extruded through a perforated plate or die, and placed on a rotating disk. The extrudate ideally breaks into pieces which are rounded into spheres, spheroids, or rounded rods on the rotating plate. Another preferred process for manufacturing matrix particles is compressing blend mixture of centanafadine and matrixing material [such as the at least one release retarding material and/or the one or more pharmaceutically acceptable excipients] to form mini-tablets. A further preferred process for manufacturing matrix particles is the preparation of melt granules. In this process, a desired amount of centanafadine is stirred with matrix material having a low melting point at an elevated temperature or above the melting temperature of the matrixing material [such as the at least one release retarding material and/or the one or more pharmaceutically acceptable excipients] to form a homogeneous mixture, cooled, and then forced through a screen to form granules. Melt granules can be prepared by applying heat while mixing centanafadine with the matrixing material having a low melting point in a granulator such as a rapid mixture granulator. A further preferred process for manufacturing matrix particles is hot melt extrusion. In this process, the centanafadine with one or more release retarding materials (such as at least one selected from a prolonged release material and an enteric material) and/or one or more excipients is fed into an extruder, followed by mixing the materials under heat and pressure in continuous motion, and lastly, forced through a die to form the desired shape particles or extrudes. The extrudes can be milled or cut to get the desired size of the matrix particle. A further preferred process for manufacturing matrix particles involves using an organic solvent to aid in the mixing of the centanafadine with the matrixing material. This technique can be used when it is desired to utilize a matrixing material with an unsuitably high melting point that, if the material were employed in a molten state, would cause decomposition of the drug or of the matrixing material, or would result in an unacceptable melt viscosity, thereby preventing mixing of centanafadine with the matrixing material. Centanafadine and matrixing material may be combined with a modest amount of solvent to form a paste and then forced through a screen to form granules from which the solvent is then removed. Alternatively, centanafadine and matrixing material may be combined with enough solvent to dissolve the matrixing material with the drug completely, and the resulting solution spray dried to form the matrix particulates or particles.

In certain embodiments, the centanafadine is embedded within a matrix of one or more release retarding materials (such as at least one selected from a prolonged release material and an enteric material) and/or one or more pharmaceutical-acceptable excipients to form a matrix coat or a drug coat, respectively, surrounding an inert core. A most preferred process for manufacturing the matrix coat or the drug coat is: dissolve the centanafadine and the matrixing material (the one or more release retarding materials and/or one or more pharmaceutical-acceptable excipients) in enough amount of solvent (aqueous, organic, or mixture thereof), and spray the resulting solution on inert cores (particle, bead, granule, or sphere of one or more pharmaceutically acceptable excipients, such as sugar sphere, microcrystalline cellulose sphere, silicon sphere, ion-exchange resin, placebo sphere such as in form of granules, beads, pellets, spheres, mini-tablets) to form the matrix coat or the drug coat surrounding the inert cores. The conventional pan coating or Wurster coating process can be used to prepare the matrix coat or the drug coat surrounding the inert core. A further useful process for preparing the matrix coat or the drug coat is powder layering of the mixture of the matrixing material and the centanafadine surrounding the inert core.

In certain embodiments, a most preferred process for manufacturing the prolonged release coat is: dissolve the prolonged release material, and optionally, one or more pharmaceutical-acceptable excipients in enough amount of solvent (aqueous, organic, or mixture thereof), and spray the resulting solution on the prepared one or more core beads of centanafadine to form the prolonged release centanafadine particulates. The conventional pan coating or Wurster coating process can be used to apply the prolonged release coat surrounding the one or more core beads of centanafadine. A further useful process for preparing the prolonged release coat is powder layering of the prolonged release material, optionally with one or more pharmaceutical-acceptable excipients, surrounding the one or more core beads of centanafadine to form the prolonged release centanafadine particulates. In certain embodiments, compression coating is also useful process to apply the prolonged release coat surrounding the one or more core beads of centanafadine, wherein the each individual core bead is compressed within a blend of the prolonged release material, optionally with one or more pharmaceutical-acceptable excipients. In certain embodiments, the core bead of centanafadine can be formulated or used in the form of (a) a particle of the centanafadine (a pure drug substance); (b) a matrix particle of the centanafadine, wherein the centanafadine is embedded or dispersed within a matrix of the one or more pharmaceutically acceptable excipient; or (c) a coat of the centanafadine surrounding an inert core, wherein the coat comprising the centanafadine and, optionally, one or more excipients. In certain embodiments, the inert core (with or without comprising drug) includes a particle, bead, granule, or sphere of one or more pharmaceutically acceptable excipients, such as a sugar sphere, microcrystalline cellulose sphere, silicon sphere, ion-exchange resin, sphere of excipients such as in the form of granules, beads, pellets, spheres, mini-tablets.

In any of the previously discussed embodiments, the inert core includes particle, bead, granule, or sphere of one or more pharmaceutically acceptable excipients, such as sugar sphere, microcrystalline cellulose sphere, silicon sphere, ion-exchange resin, placebo sphere such as in form of granules, beads, pellets, spheres, mini-tablets.

In certain embodiments, a most preferred process for manufacturing the burst release centanafadine coat (centanafadine continuous phase or outer centanafadine continuous phase) is: dissolve the centanafadine, and optionally, one or more pharmaceutical-acceptable excipients in enough amount of solvent (aqueous, organic, or mixture thereof), and spray the resulting solution on the prepared one or more centanafadine particulates or inner centanafadine particulate phase(s) to form the burst release centanafadine coat surrounding it. The conventional pan coating or Wurster coating process can be used to prepare the burst release centanafadine coat. A further useful process for preparing the burst-release centanafadine coat is powder layering of the centanafadine or a mixture of the centanafadine and one or more pharmaceutical-acceptable excipients surrounding the one or more centanafadine particulates or inner centanafadine particulate phase(s).

The various coating processes that may be useful to produce different types of coats, as described above, include solution spraying, dry powder layering, compression coating, hot melt coating, supercritical fluid coating, electrostatic spray coating, etc.

Various process useful for manufacturing the presently disclosed formulation includes granulation, palletization, roller compaction, compression, wet granulation, wurster coating, fluid bed granulation, rotary bed granulation, forming complexation of drug with ion-exchange resin, wet granulation with extrusion and spherization, hot melt extrusion, injection molding, conventional pan coating, roller compaction, etc.

In certain embodiments, once the final particulates of the centanafadine are formed, blend it together along with other appropriate compressible excipients, then compress it to form a tablet. In certain embodiments, once the final particulates of the centanafadine are formed, blend it together (optionally add other appropriate excipients if required such as talc), then fill it in a capsule, sachet, or can be mixed with other pharmaceutically acceptable excipients to form a powder for suspension formulation. The final particulates of the centanafadine can be fillable into single capsule without blending, such as using single or two station capsule filling machine.

In certain embodiments, the centanafadine multiphasic controlled-release pharmaceutical formulation can be administered in the sprinkle form, such as by sprinkling the content of the centanafadine multiphasic controlled-release pharmaceutical formulation on food or juice prior to administration, i.e., open the capsule containing centanafadine pellets, sprinkle it on food or juice, and then administer it. In certain embodiments, the centanafadine multiphasic controlled-release pharmaceutical formulation can be administered in the sprinkle form, wherein the size of each bead contain in the pharmaceutical formulation is about 150 to 2500 microns. In certain embodiments, the centanafadine multiphasic controlled-release pharmaceutical formulation can be administered by via an enteral feeding tube.

The presently disclosed centanafadine multiphasic controlled-release pharmaceutical formulation is not limited to the art of fabricating the formulation in any form; in another word, an ordinary skill in this art can also manufacture the present formulation by any other method than described herein.

Another aspect of the present disclosure is medical uses and methods of treatment using the presently disclosed centanafadine multiphasic controlled-release pharmaceutical formulation such as administering an effective amount of a formulation or dosage form according to the description herein to an animal subject in need thereof, specifically a mammalian subject in need thereof, and more specifically a human in need thereof. The formulation or dosage form can be administered to an animal, e.g. a mammalian subject, for example a human patient, to inhibit norepinephrine reuptake, and/or dopamine reuptake, and/or serotonin reuptake. The formulation or dosage form, after administering to an animal, e.g. a mammalian subject, for example a human patient, can treat, inhibit, or prevent one or more symptoms of a disorder alleviated by inhibiting norepinephrine reuptake, and/or dopamine reuptake, and/or serotonin reuptake. In certain embodiments, "treatment" or "treating" refers to amelioration of one or more symptoms of a disorder, whereby the symptom(s) is/are alleviated by inhibiting dopamine and/or norepinephrine and/or serotonin reuptake. In other embodiments, "treatment" or "treating" refers to an amelioration of at least one measurable physical parameter associated with a disorder. In yet another embodiment, "treatment" or "treating" refers to inhibiting or reducing the progression or severity of a disorder (or one or more symptoms thereof) alleviated by inhibiting dopamine and/or norepinephrine and/or serotonin reuptake, e.g., as discerned based on physical, physiological, and/or psychological parameters. A formulation or dosage form as described herein optionally can be used for delaying the onset of a disorder (or one or more symptoms thereof) by inhibiting norepinephrine and/or dopamine and/or serotonin reuptake.

In one aspect, a formulation or dosage form herein can be administered or labeled for administration in an amount based on the subject's body weight. A formulation or dosage form herein can be administered, or labeled for administration in an amount of centanafadine in a range of 0.5 mg/kg to 20 mg/kg per day, e.g., 1 mg/kg to 15 mg/kg per day, e.g., 1 mg/kg to 10 mg/kg per day, e.g., 2 mg/kg to 20 mg/kg per day, e.g., 2 mg/kg to 10 mg/kg per day, e.g., 3 mg/kg to 15 mg/kg per day, or about 1.5 mg/kg per day of centanafadine or pharmaceutically acceptable salt thereof (e.g. HCl salt). In another aspect, a formulation or dosage form described herein can include the centanafadine or pharmaceutically acceptable salt thereof (e.g. HCl salt) in an amount in a range of about 10 to about 2000 mg, or about 20 mg to about 1000 mg, or about 25 mg to about 500 mg, or about 50 mg to about 500 mg, or about 75 mg to about 500 mg, or about 100 to about 500 mg, administered (or labeled for administration) one, two, three, or four times per day.

In certain embodiments, the formulation or dosage form described herein can be used in treating a variety of conditions including attention-deficit/hyperactivity disorder (ADHD), Major Depressive Disorders, smoking and nicotine dependence, and binge eating disorder, for example. In certain embodiments, the formulation or dosage form described herein can be used in treating an autism spectrum disorder in a patient having a fragile X-associated disorder. As used herein, "autism spectrum disorder," includes autistic disorder (classic autism), Asperger's disorder (Asperger syndrome), pervasive developmental disorder not otherwise specified (PDD-NOS), Rett's disorder (Rett syndrome), and childhood disintegrative disorder (CDD). In certain embodiments, the formulation or dosage form described herein can be used in treating a fragile X-associated disorder. Fragile X-associated disorders are a family of genetic conditions that may affect individuals in a variety of ways. In certain embodiments, the formulation or dosage form described herein can be used in treating a binge eating disorder. Binge eating disorder involves recurrent episodes of binge eating. In certain embodiments, the formulations or dosage forms and related methods described herein can be used in mammalian subjects, for example, a human patient, to treat, inhibit, or prevent one or more symptom(s) of a CNS disorder alleviated by inhibiting dopamine reuptake, and/or norepinephrine reuptake, and/or serotonin reuptake. In certain embodiments, the formulations or dosage forms and related methods described herein can be used in mammalian subjects, for example, a human patient, to treat, inhibit, or prevent endogenous disorders alleviated by inhibiting dopamine and/or norepinephrine and/or serotonin reuptake. Such disorders include, but are not limited to, attention-deficit disorder, depression, anxiety, obesity, Parkinson's disease, tic disorders, and addictive disorders. In certain embodiments, the formulations or dosage forms and related methods described herein can be used in mammalian subjects, for example, a human patient, to treat, inhibit, or prevent a wide range of additional CNS disorders and associated symptoms, such as for treatment and/or prevention of attention deficit hyperactivity disorder and related symptoms, as well as forms and symptoms of alcohol abuse, drug abuse, obsessive compulsive behaviors, learning disorders, reading problems, gambling addiction, manic symptoms, phobias, panic attacks, oppositional defiant behavior, conduct disorder, academic problems in school, smoking, abnormal sexual behaviors, schizoid behaviors, somatization, depression, sleep disorders, general anxiety, stuttering, and tic disorders (see for example, U.S. Pat. No. 6,132,724). These and other symptoms, regardless of the underlying CNS disorder, are each prospective therapeutic targets for the formulations, dosage forms and related methods that mediate therapeutic benefits by inhibiting dopamine and/or norepinephrine and/or serotonin reuptake. Additional CNS disorders contemplated for treatment employing the formulations, dosage forms and related methods described herein are described, for example, in the Quick Reference to the Diagnostic Criteria From DSM-IV (Diagnostic and Statistical Manual of Mental Disorders, Fourth Edition), The American Psychiatric Association, Washington, D.C., 1994. These target disorders for treatment and/or prevention according to the invention, include, but are not limited to, Attention-Deficit/Hyperactivity Disorder, Predominately Inattentive Type; Attention-Deficit/Hyperactivity Disorder, Predominately Hyperactivity-Impulsive Type; Attention-Deficit/Hyperactivity Disorder, Combined Type; Attention-Deficit/Hyperactivity Disorder not otherwise specified (NOS); Conduct Disorder; Oppositional Defiant Disorder; and Disruptive Behavior Disorder not otherwise specified (NOS).

In an additional embodiment, the present subject matter also discloses formulations of centanafadine that can provide therapeutic levels of the drug for the period of time from 4 to 24 hours, or for the periods of from 4 to 20 hours, or for the periods of from 6 to 16 hours, or for the periods of from 6 to 12 hours.

In a further embodiment, the present subject matter discloses a method of treatment such as listed above with a high drug load-controlled release pharmaceutical formulation of centanafadine. The term "high drug load" applies to the pharmaceutical formulations comprising the centanafadine in an amount of at least about 35% w/w of the total weight of the pharmaceutical formulation or the plurality of the centanafadine particulates contained in the pharmaceutical formulation.

In certain embodiments, for administration to the mammal by the non-parenteral route such as oral, the presently disclosed pharmaceutical formulation can be compressed (with other one or more pharmaceutically acceptable excipients) to form a tablet, fill in a capsule to form a capsule dosage form, prepared as particles, prepared in suspension or a unit dose packet (sometimes refer to in the art as a "sachet").

In certain embodiments, the centanafadine multiphasic controlled-release pharmaceutical formulation is characterized by providing an in vivo absorption profile that is multimodal, optionally bimodal or trimodal. In certain embodiments, the centanafadine multiphasic controlled-release pharmaceutical formulation after administration to a subject in need thereof provides at least two Tmax (time to maximum plasma concentration of centanafadine in blood), wherein the first Tmax of centanafadine is obtained within less than about 5 hours after the administration of the formulation and the second Tmax of centanafadine is within 4 hours to 16 hours after the administration of the formulation.

In certain embodiments, the centanafadine particulates (such as prolonged release particulates, enteric-prolonged release particulates, and/or enteric-burst-prolonged release particulates) contained in the centanafadine multiphasic controlled-release pharmaceutical formulation are substantially resistant to alcohol dose dumping. The term "dose dumping" is the unintended, rapid release of a significant portion of a drug from a controlled release dosage form. It is well known that prolonged-release pharmaceutical formulations are substantially sensitive to alcohol dose dumping when administered in the presence of ethanol (Meyer, et al, "Awareness Topic: Mitigating the Risks of Ethanol Induced Dose Dumping From Oral Sustained/Controlled Release Dosage Forms," FDA's ACPS Meeting, October 2005). This phenomenon can, for example, be caused by the consumption of alcoholic beverages, leading to high ethanol concentrations in the contents of the stomach (Roth et al., "Ethanol Effects on Drug Release From Verapamil Meltrex, an Innovative Melt Extruded Formulation," Int. J. Pharm., 368, 72-75, 2009). For example, if the drug release is prolonged by a polymer and the polymer's solubility or a permeability of the drug through the polymer is affected by a presence of alcohol in the aqueous media (such as solubility of the polymer or a permeability of the drug through the polymer is increased in an aqueous media containing alcohol, such as hydro-alcoholic media), then the co-ingestion of alcoholic beverages can lead to the unintended dissolution of such polymer or enhance the drug permeability through the polymer resulting in the faster drug release. Thus, drug release can be rapid, instead of being extended over prolonged periods of time. Therefore, the term "alcohol dose dumping" in the present application refers to the unintentional, rapid release of a significant portion of the centanafadine from the centanafadine particulates (or pharmaceutical formulation); specifically, it refers to the release of more than about 75% of the centanafadine contained in the centanafadine particulates within 2 hours, when administered with alcoholic beverages containing up to 40% v/v of alcohol. However, if the centanafadine particulates (whether centanafadine prolonged release particulate, centanafadine enteric release particulates or combination thereof, or entire pharmaceutical formulation) release less than about 75% of the centanafadine they contain within 2 hours, even when administered with alcoholic beverages containing up to 40% v/v of alcohol, then the centanafadine particulates (or pharmaceutical formulation) are considered substantially resistant to alcohol dose dumping, i.e., release characteristics of the centanafadine from the centanafadine particulates (or pharmaceutical formulation) is considered to be substantially resistant to alcohol dose dumping. The alcohol dose dumping characteristics of the centanafadine particulates can be determined by in-vitro measurement of cumulative centanafadine releases from the centanafadine particulates (whether centanafadine prolonged release particulates, centanafadine enteric release particulates, or combination thereof, prior to applying burst release coat surrounding the centanafadine particulates,) in 900 ml of ethanolic aqueous media containing up to 40% v/v ethanol [for e.g., the mixture of 540 ml (60% v/v) of 0.1N HCl or phosphate buffer with the pH of about 6 to 8+360 ml (40% v/v) of ethanol make 900 ml of 40% v/v ethanolic media] at a temperature of 37°±1° C. using either USP apparatus 2 (paddle) at 50 RPM (or 75 RPM) or USP apparatus 1 (basket) at 100 RPM (or 150 RPM). The centanafadine particulates are considered to be sensitive to alcohol dose dumping if it releases more than about 75% amount of the centanafadine contained therein within 2 hours. The centanafadine particulates are considered to be substantially resistant to alcohol dose dumping if it releases less than about 75% amount of the centanafadine contained therein within 2 hours. Han Lennernas, "Ethanol-Drug Absorption Interaction: Potential for a Significant Effect on the Plasma Pharmacokinetics of Ethanol Vulnerable Formulations,"

Mol. Pharmaceutics, 2009, 6 (5), pp 1429-1440, incorporated by reference in its entirety, recommends a two-hour time frame for screening the in vitro dissolution profile of an extended-release product in ethanol concentrations of up to 40% v/v. In certain embodiments, the presently disclosed pharmaceutical formulations after administering with the 40% alcoholic beverages (e.g., 40% alcohol in orange juice) provide the second Tmax (relative mean or median Tmax) of centanafadine in the range of about 25% to about 200% as compared to administering the same dose of the presently disclosed pharmaceutical formulations without the 40% alcoholic beverages (eg. 0% alcohol in orange juice). In certain embodiments, the presently disclosed centanafadine multi-phasic controlled release pharmaceutical formulations after administering with the 40% alcoholic beverages (e.g., 40% alcohol in orange juice) provide lower Cmax (relative mean or median Cmax) of centanafadine compared to administering relatively the same dose amount of the centanafadine in only burst release form.

In certain embodiments, the centanafadine multiphasic controlled release pharmaceutical formulation comprising, based on the total weight of centanafadine contained therein, about 1%-45% w/w of centanafadine in burst release form; about 10%-88% w/w of centanafadine in prolonged-release form; and about 8%-80% w/w of centanafadine in enteric release form, wherein the pharmaceutical formulation collectively release about 1 to 45% of centanafadine contained therein at 1 hour, about 5 to 65% of centanafadine contained therein at 2 hours, about 15 to 75% of centanafadine contained therein at 4 hours, and about 65 to 100% of centanafadine contained therein at 12 hours when measured in-vitro in 900 ml of water at a temperature of 37°±1° C. using either USP apparatus 2 (paddle) at 50 RPM (or 75 RPM) or USP apparatus 1 (basket) at 100 RPM (or 150 RPM).

In certain embodiments, the centanafadine multiphasic controlled release pharmaceutical formulation comprising, based on the total weight of centanafadine contained therein, about 1%-45% w/w of centanafadine in burst release form; and about 55%-99% w/w of centanafadine in prolonged-release form, wherein the pharmaceutical formulation collectively release about 1 to 45% of centanafadine contained therein at 1 hour, about 5 to 65% of centanafadine contained therein at 2 hours, about 15 to 75% of centanafadine contained therein at 4 hours, and about 65 to 100% of centanafadine contained therein at 12 hours when measured in-vitro in 900 ml of water at a temperature of 37°±1° C. using either USP apparatus 2 (paddle) at 50 RPM (or 75 RPM) or USP apparatus 1 (basket) at 100 RPM (or 150 RPM).

In certain embodiments, the centanafadine multiphasic controlled release pharmaceutical formulation comprising, based on the total weight of centanafadine contained therein, about 1%-45% w/w of centanafadine in burst release form; and about 55%-99% w/w of centanafadine in enteric release form (herein the enteric release means enteric-prolonged release form or enteric-burst-prolonged release form), wherein the pharmaceutical formulation collectively release about 1 to 45% of centanafadine contained therein at 1 hour, about 5 to 65% of centanafadine contained therein at 2 hours, about 15 to 75% of centanafadine contained therein at 4 hours, and about 65 to 100% of centanafadine contained therein at 12 hours when measured in-vitro in 900 ml of water or phosphate buffer with pH 7.2 (or pH 8) at a temperature of 37°±1° C. using either USP apparatus 2 (paddle) at 50 RPM (or 75 RPM) or USP apparatus 1 (basket) at 100 RPM (or 150 RPM).

In certain embodiments, the centanafadine multiphasic controlled release pharmaceutical formulation comprising, based on the total weight of centanafadine contained therein, about 1%-45% w/w of centanafadine in burst release form; and about 55%-99% w/w of centanafadine in enteric release form (herein the enteric release means enteric-burst release form), wherein the pharmaceutical formulation collectively release about 1 to 45% of centanafadine contained therein at 2 hour, and about 45 to 100% of centanafadine contained therein at 4 hours when measured in-vitro in 900 ml of 0.1N HCl for initial 2 hours followed by in 900 ml of phosphate buffer with pH 7.2 (or pH 8) for another 2 hours (totaling of 4 hours) at a temperature of 37°±1° C. using either USP apparatus 2 (paddle) at 50 RPM (or 75 RPM) or USP apparatus 1 (basket) at 100 RPM (or 150 RPM).

EXAMPLES

The invention will now be illustrated by the following examples which are not to be taken as limiting. In general, the examples demonstrate the formulation and process preparation of the presently disclosed pharmaceutical formulation within the scope of this invention.

Example 1: Preparation of Prolonged Release Centanafadine Particulates Encased Within Burst Release Coat of Centanafadine The following table describes the manufacturing formula:

| Sr. No. | Ingredients | % w/w |
|---|---|---|
| A. CENTANAFADINE PARTICULATE PHASE Centanafadine Prolonged Release Particulates Seal Coated Inert Cores | | |
| 1 | Inert cores (MCC Spheres) | 25% |
| 2 | Water-soluble polymer [HPMC based Opadry ®] | 1.5% |
| 3 | Purified Water* | q.s. |
| Core Beads of Drug | | |
| 4 | Drug (HCl Salt) | 31.5 |
| 5 | Binder or water-soluble polymer [HPMC based Opadry ®] | 2.5 |
| 6 | Diluent, filler or osmotic agent (Mannitol) | 5.0 |
| 7 | Anti-tacking Agent (silica) | 0.5 |
| 8 | Anti-tacking Agent (Talc) | 0.5 |
| 9 | Purified Water* | q.s. |
| Seal Coated Drug's Beads | | |
| 10 | Binder or water-soluble polymer [HPMC based Opadry ®] | 3.0 |
| 11 | Purified Water* | q.s. |
| Prolonged Release Coat | | |
| 12 | Water Insoluble Polymer (Ethyl cellulose Aqueous Dispersion#) | 15.5 |
| 13 | Plasticizer (Triethyl Citrate) | 5.2 |
| 14 | Water soluble polymer (flux enhancer or pore former) (Guar Gum) | 2.3 |
| 15 | Purified Water* | q.s. |
| B. CENTANAFADINE CONTINEOUS PHASE Burst Release Coat of Centanafadine | | |
| 16 | Drug (HCl Salt) | 3.5 |
| 17 | Binder or water-soluble polymer [HPMC based Opadry ®] | 2.0 |
| 18 | Diluent or filler (Mannitol) | 1.0 |
| 19 | Anti-tacking Agent (silica) | 0.5 |
| 20 | Anti-tacking Agent (Talc) | 0.5 |
| 21 | Purified Water* | q.s. |
| | Total | 100.0 |

*Evaporate during the manufacturing process.
Weight based on solid continent in ethyl cellulose aqueous dispersion.

Manufacturing Procedures:

Seal coated inert cores: Dissolve HPMC based Opadry® in purified water. Transfer the MCC spheres in FBP (Wurster—bottom spray) and coat it using the HPMC solution to form the seal coat on each MCC sphere.

Core beads of drug: Add drug (HCl salt), HPMC based Opadry®, mannitol, silica, and talc into purified water to prepare the drug dispersion. Coat the seal coated MCC spheres in FBP (Wurster) using the drug dispersion to form the core beads of drug.

Seal Coated Drug's Beads: Dissolve HPMC based Opadry® in purified water. Coat the core beads of drug using the HPMC solution to form the seal coated drug's beads.

Prolonged Release Coat: Add the triethyl citrate into the ethyl cellulose aqueous dispersion and stir it for 90 minutes. Dissolve the guar gum into purified water separately and the add the guar gum solution into the ethyl cellulose aqueous dispersion and mix it for another 60 minutes. Coat the seal coated drug's beads in FBP (Wurster) using the final ethyl cellulose aqueous dispersion (containing triethyl citrate and guar gum) to form the prolonged release centanafadine particulates.

Burst Release Coat of Centanafadine: Add drug (HCl salt), HPMC based Opadry®, mannitol, silica, and talc into purified water to prepare the drug dispersion. Coat the prolonged release centanafadine particulates in FBP (Wurster) using the drug dispersion to form the centanafadine bi-phasic beads (prolonged release centanafadine particulates encased within burst release coat of centanafadine).

Example 2: Preparation of Enteric Prolonged Release Centanafadine Particulates Encased Within Burst Release Coat of Centanafadine The following table describes the manufacturing formula:

| Sr. No. | Ingredients | % W/W |
|---|---|---|
| | A. CENTANAFADINE PARTICULATE PHASE Centanafadine Enteric-Prolonged Release Particulates Seal Coated Inert Cores | |
| 1 | Inert cores (MCC Spheres) | 22.5 |
| 2 | Water-soluble polymer [HPMC based Opadry ®] | 1.3 |
| 3 | Purified Water* | q.s. |
| | Core Beads of Drug | |
| 4 | Drug (HCl Salt) | 31.5 |
| 5 | Binder or water-soluble polymer [HPMC based Opadry ®] | 2.2 |
| 6 | Diluent, filler or osmotic agent (Mannitol) | 4.5 |
| 7 | Anti-tacking Agent (silica) | 0.5 |
| 8 | Anti-tacking Agent (Talc) | 0.5 |
| 9 | Purified Water* | q.s. |
| | Seal Coated Drug's Beads | |
| 10 | Binder or water-soluble polymer [HPMC based Opadry ®] | 2.5 |
| 11 | Purified Water* | q.s. |
| | Prolonged Release Coat | |
| 12 | Water Insoluble Polymer (Ethyl cellulose Aqueous Dispersion#) | 12.0 |
| 13 | Plasticizer (Triethyl Citrate) | 3.0 |
| 14 | Water soluble polymer (flux enhancer or pore former) (Guar Gum) | 2.0 |
| 15 | Purified Water* | q.s. |
| | Enteric Coat | |
| 16 | Enteric Polymer [Poly(Methyl Acrylate-CO-Methyl Methacrylate-CO-Methacrylic Acid) (Eudragit ® FS 30 D, Aq. Dispersion)]## | 9.0 |
| 17 | Glidant and Plasticizer Premix (PlasACRYL ® T20) | 1.0 |
| 18 | Purified Water* | q.s. |
| | B. CENTANAFADINE CONTINEOUS PHASE Burst Release Coat of Centanafadine | |
| 19 | Drug (HCl Salt) | 3.5 |
| 20 | Binder or water-soluble polymer [HPMC based Opadry ®] | 2.0 |
| 21 | Diluent or filler (Mannitol) | 1.0 |
| 22 | Anti-tacking Agent (silica) | 0.5 |
| 23 | Anti-tacking Agent (Talc) | 0.5 |
| 24 | Purified Water* | q.s. |
| | Total | 100.0 |

*Evaporate during the manufacturing process.
Weight based on solid continent in ethyl cellulose aqueous dispersion.
Weight based on solid continent in Eudragit FS 30D dispersion.

Manufacturing Procedures:

Seal coated inert cores: Dissolve HPMC based Opadry® in purified water. Transfer the MCC spheres in FBP (Wurster—bottom spray) and coat it using the HPMC solution to form the seal coat on each MCC sphere.

Core beads of drug: Add drug (HCl salt), HPMC based Opadry®, mannitol, silica, and talc into purified water to prepare the drug dispersion. Coat the seal coated MCC spheres in FBP (Wurster) using the drug dispersion to form the core beads of drug.

Seal Coated Drug's Beads: Dissolve HPMC based Opadry® in purified water. Coat the core beads of drug using the HPMC solution to form the seal coated drug's beads.

Prolonged Release Coat: Add the triethyl citrate into the ethyl cellulose aqueous dispersion and stir it for 90 minutes. Dissolve the guar gum into purified water separately and the add the guar gum solution into the ethyl cellulose aqueous dispersion and mix it for another 60 minutes. Coat the seal coated drug's beads in FBP (Wurster) using the final ethyl cellulose aqueous dispersion (containing triethyl citrate and guar gum) to form the prolonged release centanafadine particulates.

Enteric Coat: Prepare the enteric coating solution by adding PlasACRYL® T20 and purified water to Eudragit FD 30D. Coat the prolonged release centanafadine particulates in FBP (Wurster) using the enteric coating solution to form enteric-prolonged release centanafadine particulates.

Burst Release Coat of Centanafadine: Add drug (HCl salt), HPMC based Opadry®, mannitol, silica, and talc into purified water to prepare the drug dispersion. Coat the enteric-prolonged release centanafadine particulates in FBP (Wurster) using the drug dispersion to form the centanafadine bi-phasic beads (enteric-prolonged release centanafadine particulates encased within burst release coat of centanafadine).

Example 3: Capsule Filling

Fill the size 00 capsule with about 300 mg of the centanafadine bi-phasic beads of example 1 and about 300 mg of the centanafadine bi-phasic beads of example 2 to form centanafadine multiphasic controlled release pharmaceutical formulation that provide, based on the total weight of centanafadine contained therein, about 10% w/w of centanafadine in a burst release form, about 45% w/w of centanafadine in a prolonged-release form, and about 45% w/w of centanafadine in an enteric release form.

Example 4: Preparation of Prolonged Release Centanafadine Particulates Encased Within Burst Release Coat of Centanafadine The following table describes the manufacturing formula:

| Sr. No. | Ingredients | % W/W |
|---|---|---|
| | A. CENTANAFADINE PARTICULATE PHASE Centanafadine Prolonged Release Particulates Core Beads of Drug | |
| 1 | Drug (HCl Salt) | 31.5 |
| 2 | Water Insoluble Diluent (Vivapur PH 101) | 24.5 |
| 3 | Binder [Hypromellose] | 2.5 |
| 4 | Water Soluble Diluent (Mannitol) | 7.0 |
| 5 | Glidant (Silicon Dioxide) | 0.3 |
| 6 | Lubricant (Magnesium Stearate) | 0.7 |
| 7 | Purified Water* | q.s. |
| | Seal Coated Drug's Beads | |
| 8 | Binder or water-soluble polymer [HPMC based Opadry ®] | 3.5 |
| 9 | Purified Water* | q.s. |
| | Prolonged Release Coat | |
| 10 | Water Insoluble Polymer (Ethyl cellulose Aqueous Dispersion#) | 15.0 |
| 11 | Plasticizer (Triethyl Citrate) | 5.0 |
| 12 | Water soluble polymer (flux enhancer or pore former) (Guar Gum) | 2.5 |
| 13 | Purified Water* | q.s. |
| | B. CENTANAFADINE CONTINEOUS PHASE Burst Release Coat of Centanafadine | |
| 14 | Drug (HCl Salt) | 3.5 |
| 15 | Binder or water-soluble polymer [HPMC based Opadry ®] | 2.0 |
| 16 | Diluent or filler (Mannitol) | 1.0 |
| 17 | Anti-tacking Agent (silica) | 0.5 |
| 18 | Anti-tacking Agent (Talc) | 0.5 |
| 19 | Purified Water* | q.s. |
| | Total | 100.0 |

*Evaporate during the manufacturing process.
Weight based on solid continent in ethyl cellulose aqueous dispersion.

Manufacturing Procedures:

Core beads of drug: Mix drug (HCl salt), Vivapur 101 and Mannitol in high shear granulator and granulate the mixture using Hypromellose solution in purified water. Dry the drug's granules in FBD. Mix silicon dioxide and magnesium stearate with the dried granules in suitable size blender for appropriate time. Compress the prepared final blend on compression machine using 1.5 mm size tablet tooling to get core beads of the drug with the size of 1.5 mm in diameter.

Seal Coated Drug's Beads: Dissolve HPMC based Opadry® in purified water. Coat the core beads of drug using the HPMC solution to form the seal coated drug's beads.

Prolonged Release Coat: Add the triethyl citrate into the ethyl cellulose aqueous dispersion and stir it for 90 minutes. Dissolve the guar gum into purified water separately and then add the guar gum solution into the ethyl cellulose aqueous dispersion and mix it for another 60 minutes. Coat the seal coated drug's beads using the final ethyl cellulose aqueous dispersion (containing triethyl citrate and guar gum) to form the prolonged release centanafadine particulates.

Burst Release Coat of Centanafadine: Add drug (HCl salt), HPMC based Opadry®, mannitol, silica, and talc into purified water to prepare the drug dispersion. Coat the prolonged release centanafadine particulates using the drug dispersion to form the centanafadine bi-phasic beads (prolonged release centanafadine particulates encased within burst release coat of centanafadine).

Example 5

Preparation of Enteric Prolonged Release Centanafadine Particulates Encased Within Burst Release Coat of Centanafadine:

The following table describes the manufacturing formula:

| Sr. No. | Ingredients | % W/W |
|---|---|---|
| | A. CENTANAFADINE PARTICULATE PHASE Centanafadine Enteric Prolonged Release Particulates Core Beads of Drug | |
| 1 | Drug (HCl Salt) | 33.5 |
| 2 | Water Insoluble Diluent (Vivapur PH 101) | 20.0 |
| 3 | Binder [Hypromellose] | 2.5 |
| 4 | Water Soluble Diluent (Mannitol) | 5.0 |
| 5 | Glidant (Silicon Dioxide) | 0.3 |
| 6 | Lubricant (Magnesium Stearate) | 0.7 |
| 7 | Purified Water* | q.s. |
| | Seal Coated Drug's Beads | |
| 8 | Binder or water-soluble polymer [HPMC based Opadry ®] | 3.3 |
| 9 | Purified Water* | q.s. |
| | Prolonged Release Coat | |
| 10 | Water Insoluble Polymer (Ethyl cellulose Aqueous Dispersion#) | 13.0 |
| 11 | Plasticizer (Triethyl Citrate) | 3.2 |
| 12 | Water soluble polymer (flux enhancer or pore former) (Guar Gum) | 2.0 |
| 13 | Purified Water* | q.s. |
| | Enteric Coat | |
| 14 | Enteric Polymer [Poly(Methyl Acrylate-CO-Methyl Methacrylate-CO-Methacrylic Acid) (Eudragit ® FS 30 D, Aq. Dispersion)]## | 8.1 |
| 15 | Glidant and Plasticizer Premix (PlasACRYL ® T20) | 0.9 |
| 16 | Purified Water* | q.s. |
| | B. CENTANAFADINE CONTINEOUS PHASE Burst Release Coat of Centanafadine | |
| 17 | Drug (HCl Salt) | 4.0 |
| 18 | Binder or water-soluble polymer [HPMC based Opadry ®] | 1.0 |
| 19 | Diluent or filler (Mannitol) | 1.0 |
| 20 | Anti-tacking Agent (silica) | 0.5 |
| 21 | Anti-tacking Agent (Talc) | 1.0 |
| 22 | Purified Water* | q.s. |
| | Total | 100.0 |

*Evaporate during the manufacturing process.
Weight based on solid continent in ethyl cellulose aqueous dispersion.
Weight based on solid continent in Eudragit FS 30D dispersion Manufacturing Procedures:

Core beads of drug: Mix drug (HCl salt), Vivapur 101 and Mannitol in high shear granulator and granulate the mixture using Hypromellose solution in purified water. Dry the drug's granules in FBD. Mix silicon dioxide and magnesium stearate with the dried granules in suitable size blender for appropriate time. Compress the prepared final blend on compression machine using 1.5 mm size tablet tooling to get core beads of the drug with the size of about 1.5 mm in diameter (maximum dimension in any side is about <2.0 mm).

Seal Coated Drug's Beads: Dissolve HPMC based Opadry® in purified water. Coat the core beads of drug using the HPMC solution to form the seal coated drug's beads.

Prolonged Release Coat: Add the triethyl citrate into the ethyl cellulose aqueous dispersion and stir it for 90 minutes. Dissolve the guar gum into purified water separately and then add the guar gum solution into the ethyl cellulose aqueous dispersion and mix it for another 60 minutes. Coat the seal coated drug's beads using the final ethyl cellulose aqueous dispersion (containing triethyl citrate and guar gum) to form the prolonged release centanafadine particulates.

Enteric Coat: Prepare the enteric coating solution by adding PlasACRYL® T20 and purified water to Eudragit FD 30D. Coat the prolonged release centanafadine particulates using the enteric coating solution to form enteric-prolonged release centanafadine particulates.

Burst Release Coat of Centanafadine: Add drug (HCl salt), HPMC based Opadry®, mannitol, silica, and talc into purified water to prepare the drug dispersion. Coat the enteric-prolonged release centanafadine particulates using the drug dispersion to form the centanafadine bi-phasic beads (enteric-prolonged release centanafadine particulates encased within burst release coat of centanafadine).

Example 6: Capsule Filling

Fill the size 00 capsule with about 420 mg of the centanafadine bi-phasic beads of example 4 and about 168 mg of the centanafadine bi-phasic beads of example 5 to form centanafadine multiphasic controlled release pharmaceutical formulation that provide, based on the total weight of centanafadine contained therein, about 10.2% w/w of centanafadine in a burst release form, about 63% w/w of centanafadine in a prolonged-release form, and about 26.8% w/w of centanafadine in an enteric release form.

What is claimed is:

1. A centanafadine multiphasic controlled-release pharmaceutical formulation consisting of a plurality of centanafadine bi-phasic beads, wherein the plurality of centanafadine bi-phasic beads consisting of:
   a) one or more centanafadine bi-phasic beads formed of an inner prolonged release centanafadine particulate core encased within an outer centanafadine continuous burst-release coating,
   wherein each of the one or more centanafadine bi-phasic beads, with a size in the range of about 150 microns to about 2500 microns comprising the centanafadine as sole pharmaceutical active ingredient and one or more prolonged release materials in the amount of about 0.5-65% w/w of the total weight of the pharmaceutical formulation,
   wherein each of the one or more centanafadine bi-phasic beads provide a burst release followed by a prolonged release of the centanafadine contained therein,
   wherein the inner prolonged release centanafadine particulate core comprising the centanafadine as sole pharmaceutical active ingredient, and one or more prolonged release materials selected from the group consisting of cellulose acetate, cellulose acetate butyrate, cellulose triacetate, ethyl cellulose, wax, methacrylic acid derivatives, polymethacrylate and its copolymer, poly (ethyl acrylate-co-methyl methacrylate) ethyl acrylate methyl methacrylate copolymer, poly (ethyl acrylate-co-methyl methacrylate-cotrimethylammonioethyl methacrylate chloride), polyvinyl acetate, copolymers of vinyl pyrrolidone and vinyl acetate, vinyl acetate and copolymer thereof, cationic copolymers of ethyl acrylate, methyl methacrylate, and methacrylic acid ester with quaternary ammonium groups,
   wherein the outer centanafadine continuous burst-release coating is formed surrounding the inner prolonged release centanafadine particulate core and comprising the centanafadine as sole pharmaceutical active ingredient and one or more excipients in the weight ratio of about 10:0 to 2:8, respectively,
   wherein the amount of the centanafadine contained in the inner prolonged release centanafadine particulate core and the outer centanafadine continuous burst-release coating is in a weight ratio of about 99:1 to 40:60, respectively,
   wherein the inner prolonged release centanafadine particulate phase of the one or more centanafadine bi-phasic beads, based on the total amount of centanafadine contained therein, collectively releases the centanafadine in an amount of more than about 5% w/w but less than about 65% w/w at 2 hours when measured in-vitro in 900 ml of 0.1N HCl, and the outer centanafadine continuous phase of the one or more centanafadine bi-phasic beads collectively releases at least about 75% w/w amount of centanafadine contained therein in less than about 2 hours when measured in-vitro in 900 ml of 0.1N HCl; and
   b) one or more centanafadine bi-phasic beads formed of an inner enteric release centanafadine particulate core encased within an outer centanafadine continuous burst-release coating,
   wherein each of the one or more centanafadine bi-phasic beads, with a size in the range of about 150 microns to about 2500 microns comprising the centanafadine as sole pharmaceutical active ingredient and one or more enteric release materials in the amount of about 0.5-65% w/w of the total weight of the pharmaceutical formulation,
   wherein each of the one or more centanafadine bi-phasic beads provide a burst release followed by an enteric release of the centanafadine contained therein, wherein the inner enteric release centanafadine particulate core comprising the centanafadine as sole pharmaceutical active ingredient and one or more enteric release materials selected from the group consisting of amylose acetate phthalate, cellulose acetate phthalate, cellulose acetate succinate, cellulose acetate trimellitate, carboxymethyl ethylcellulose, co-polymerized methacrylic acid/methacrylic acid/methyl esters, co-polymerized methacrylic acid/methyl methacrylate, co-polymerized methylacrylate/methyl methacrylate/methacrylic acid, hydroxypropyl methylcellulose acetate succinate, hydroxypropyl methylcellulose phthalate, and polyvinyl acetate phthalate,
   wherein the outer centanafadine continuous burst-release coating is formed surrounding the inner enteric release centanafadine particulate core and comprising the centanafadine as sole pharmaceutical active ingredient and one or more excipients in the weight ratio of about 10:0 to 2:8, respectively,
   wherein the amount of the centanafadine contained in the inner enteric release centanafadine particulate core and the outer centanafadine continuous burst-release coating is in a weight ratio of about 99:1 to 40:60, respectively,
   wherein the inner enteric release centanafadine particulate core of the one or more centanafadine bi-phasic beads, based on the total amount of centanafadine contained therein, collectively releases the centanafadine in an amount of more than about 5% w/w but less than about 65% w/w at 2 hours when measured in-vitro in 900 ml of phosphate buffer pH 6.8, and the outer centanafadine continuous burst-release coating of the one or more centanafadine bi-phasic beads collectively releases at least about 75% w/w amount of centanafadine contained therein in less than about 2 hours when measured in-vitro in 900 ml of 0.1N HCl, wherein, based on the total weight of the plurality of centanafadine bi-phasic beads, about 15-90% w/w the centanafadine bi-phasic beads are formulated to provide the burst release followed by the prolonged release of the centanafadine contained therein and about 10-85% w/w of the centanafadine bi-phasic beads are formulated to provide the burst release followed by the enteric release of the centanafadine contained therein, wherein the centanafadine multiphasic controlled-release pharmaceutical formulation provides, based on the total weight of centanafadine contained therein, about 1%-45% w/w of centanafadine in the burst release form, about 10%-88% w/w of centanafadine in the prolonged-release form, and about 8%-80% w/w of centanafadine in the enteric release form, and wherein the centanafadine multiphasic controlled-release pharmaceutical formulation collectively release about 1 to 45% of centanafadine contained therein at 1 hour, about 5 to 65% of centanafadine contained therein at 2 hours, about 15 to 75% of centanafadine contained therein at 4 hours, and about 65 to 100% of centanafadine contained therein at 12 hours when measured in-vitro in 900 ml of water at a temperature of 37°±1° C. using either USP apparatus 2 at 50 RPM or USP apparatus 1 at 100 RPM.

2. The centanafadine multiphasic controlled-release pharmaceutical formulation of claim 1, wherein the inner prolonged release centanafadine particulate phase comprising: (a) a core bead comprising the centanafadine, and, optionally, one or more excipients; and (b) a prolonged release coat surrounding the core bead, wherein the prolonged release coat comprising the one or more prolonged release materials in an amount of about 10-100% w/w of the total weight of the prolonged release coat.

3. The centanafadine multiphasic controlled-release pharmaceutical formulation of claim 1, wherein the inner prolonged release centanafadine particulate phase comprising the centanafadine that is embedded or dispersed within a matrix of the one or more prolonged release materials, wherein the matrix is formulated as a matrix particulate or a matrix coat surrounding an inert core.

4. The centanafadine multiphasic controlled-release pharmaceutical formulation of claim 1, wherein the inner enteric release centanafadine particulate phase comprising: (a) a prolonged release centanafadine particulate; and (b) an enteric coat surrounding the prolonged release centanafadine particulate in an amount of about 10-100% w/w of the total weight of the enteric coat.

5. The centanafadine multiphasic controlled-release pharmaceutical formulation of claim 4, wherein the prolonged release centanafadine particulate comprising: (a) a core bead comprising the centanafadine, and, optionally, one or more excipients; and (b) a prolonged release coat surrounding the core bead, wherein the prolonged release coat comprising the one or more prolonged release materials in an amount of about 10-100% w/w of the total weight of the prolonged release coat.

6. The centanafadine multiphasic controlled-release pharmaceutical formulation of claim 4, wherein the prolonged release centanafadine particulate comprising the centanafadine that is embedded or dispersed within a matrix of the one or more prolonged release materials, wherein the matrix is formulated as a matrix particulate or a matrix coat surrounding an inert core.

* * * * *